(12) United States Patent
Jung et al.

(10) Patent No.: US 12,499,947 B2
(45) Date of Patent: Dec. 16, 2025

(54) MEMORY DEVICE FOR PERFORMING FOGGY-FINE PROGRAM OPERATION AND METHOD OF OPERATING THE MEMORY DEVICE

(71) Applicant: SK hynix Inc., Icheon-si (KR)

(72) Inventors: Jae Yeop Jung, Icheon-si (KR); Dong Hun Kwak, Icheon-si (KR); Yeong Jo Mun, Icheon-si (KR); Hyun Seob Shin, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 284 days.

(21) Appl. No.: 18/300,958

(22) Filed: Apr. 14, 2023

(65) Prior Publication Data

US 2024/0161831 A1    May 16, 2024

(30) Foreign Application Priority Data

Nov. 16, 2022  (KR) .................. 10-2022-0153570

(51) Int. Cl.
*G11C 16/04*    (2006.01)
*G06F 13/16*    (2006.01)
(Continued)

(52) U.S. Cl.
CPC .......... *G11C 16/10* (2013.01); *G06F 13/1668* (2013.01); *G11C 16/0483* (2013.01);
(Continued)

(58) Field of Classification Search
CPC ..... G11C 16/10; G11C 16/0483; G11C 16/08; G11C 16/3427; G11C 16/3459; G11C 11/5628; G11C 11/5671; G11C 16/24; G11C 16/26; G11C 16/30; G11C 16/34; G11C 16/3418; G11C 16/14; G06F 13/1668
(Continued)

(56) References Cited

U.S. PATENT DOCUMENTS 10,854,263 B2 * 12/2020 Her .................. G11C 16/10
11,238,924 B2 *  2/2022 Hara ................ G06F 3/0619

FOREIGN PATENT DOCUMENTS

| KR | 1020080089426 A | 10/2008 |
| KR | 1020180013127 A | 2/2018 |
| KR | 1020180035492 A | 4/2018 |

* cited by examiner

*Primary Examiner* — Tha-O H Bui
(74) *Attorney, Agent, or Firm* — WILLIAM PARK AND ASSOCIATES LTD.

(57) ABSTRACT

Provided herein is a memory device for performing a foggy-fine program operation and a method of operating the memory device. The memory device includes a memory block including a plurality of memory cells, a peripheral circuit configured to perform a program operation on selected memory cells among the plurality of cells, and a control logic configured to control the program operation by the peripheral circuit. The control logic is configured to control the peripheral circuit to perform a foggy program operation on first memory cells coupled to a first word line, among the plurality of memory cells, perform a foggy program operation on second memory cells coupled to a second word line adjacent to the first word line, among the memory cells, and perform a fine program operation on the first memory cells by decreasing a verify pass voltage to be applied to the second word line.

21 Claims, 20 Drawing Sheets

(51) Int. Cl.
  *G11C 16/08* (2006.01)
  *G11C 16/10* (2006.01)
  *G11C 16/34* (2006.01)
(52) U.S. Cl.
  CPC .......... *G11C 16/08* (2013.01); *G11C 16/3427* (2013.01); *G11C 16/3459* (2013.01)
(58) Field of Classification Search
  USPC .................................................. 365/185.11
  See application file for complete search history.

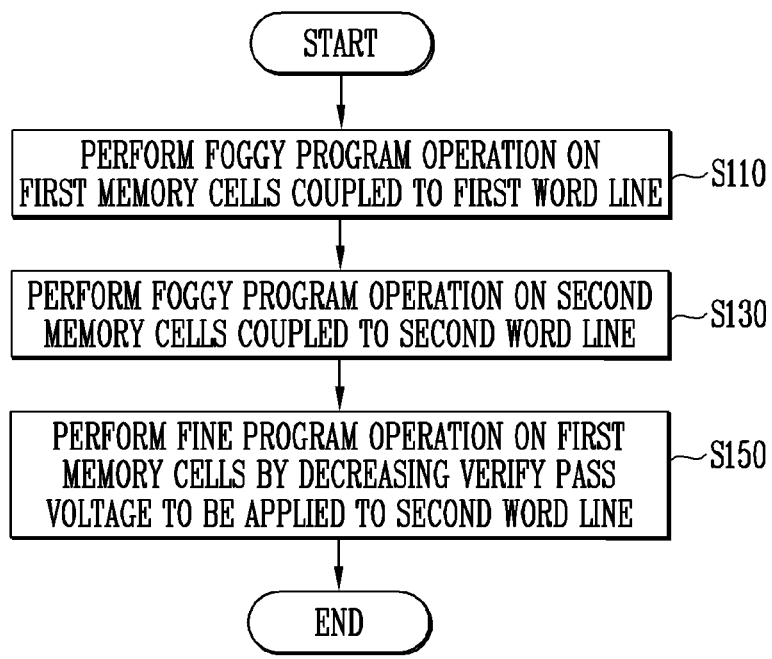
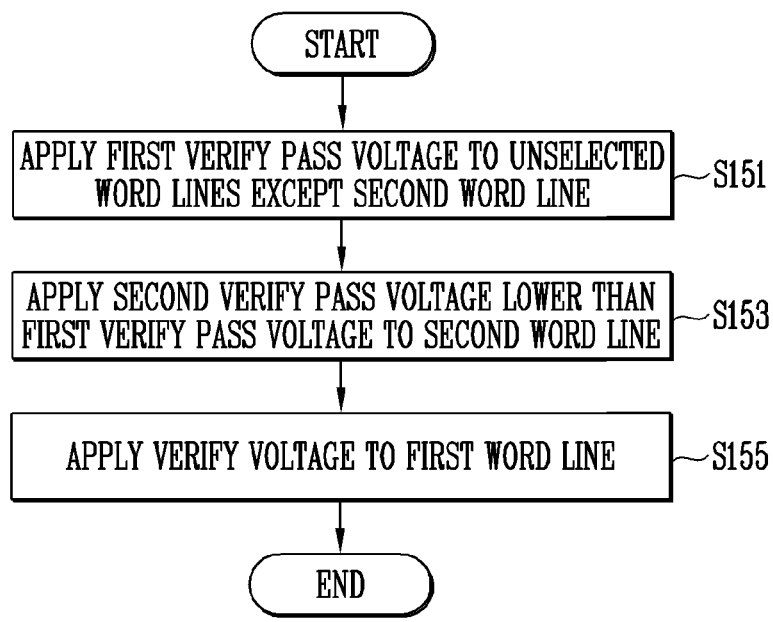

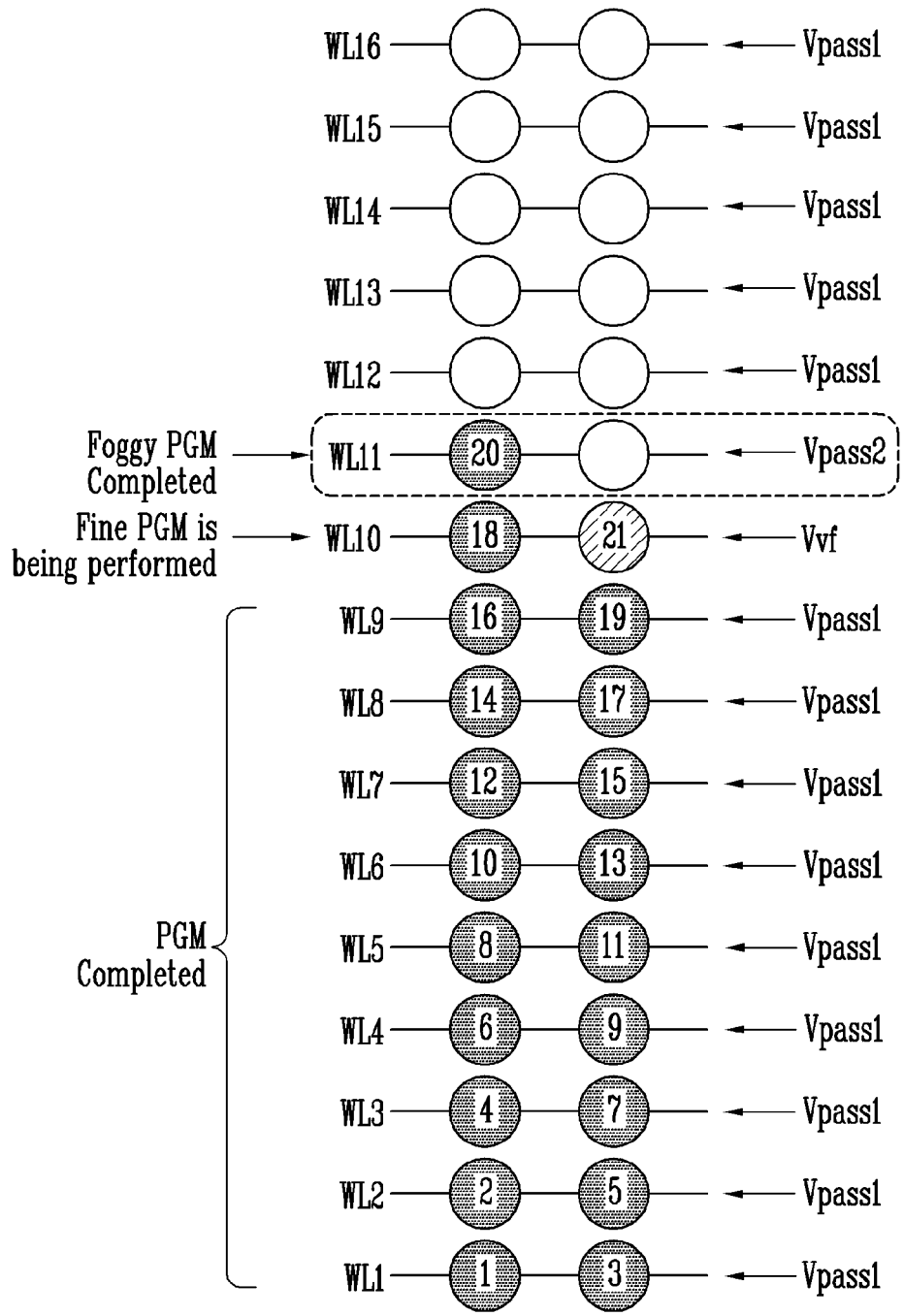

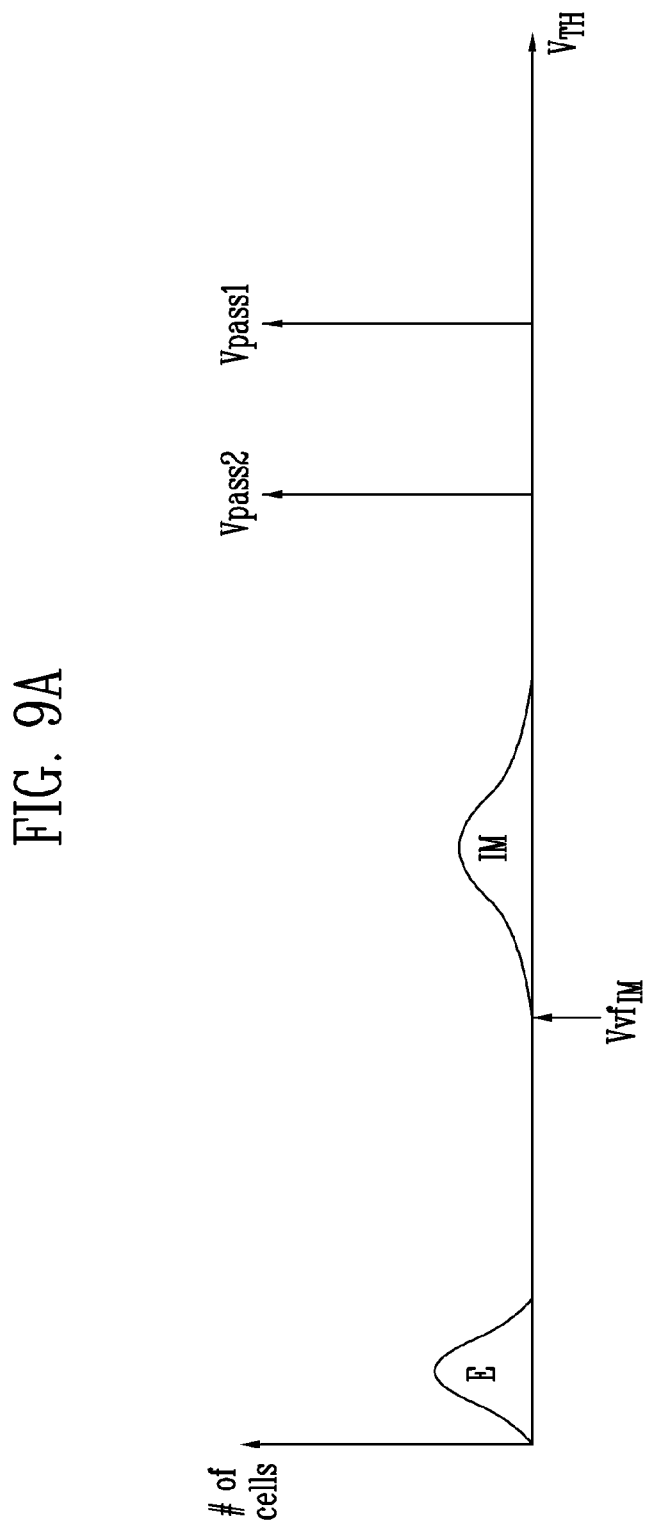

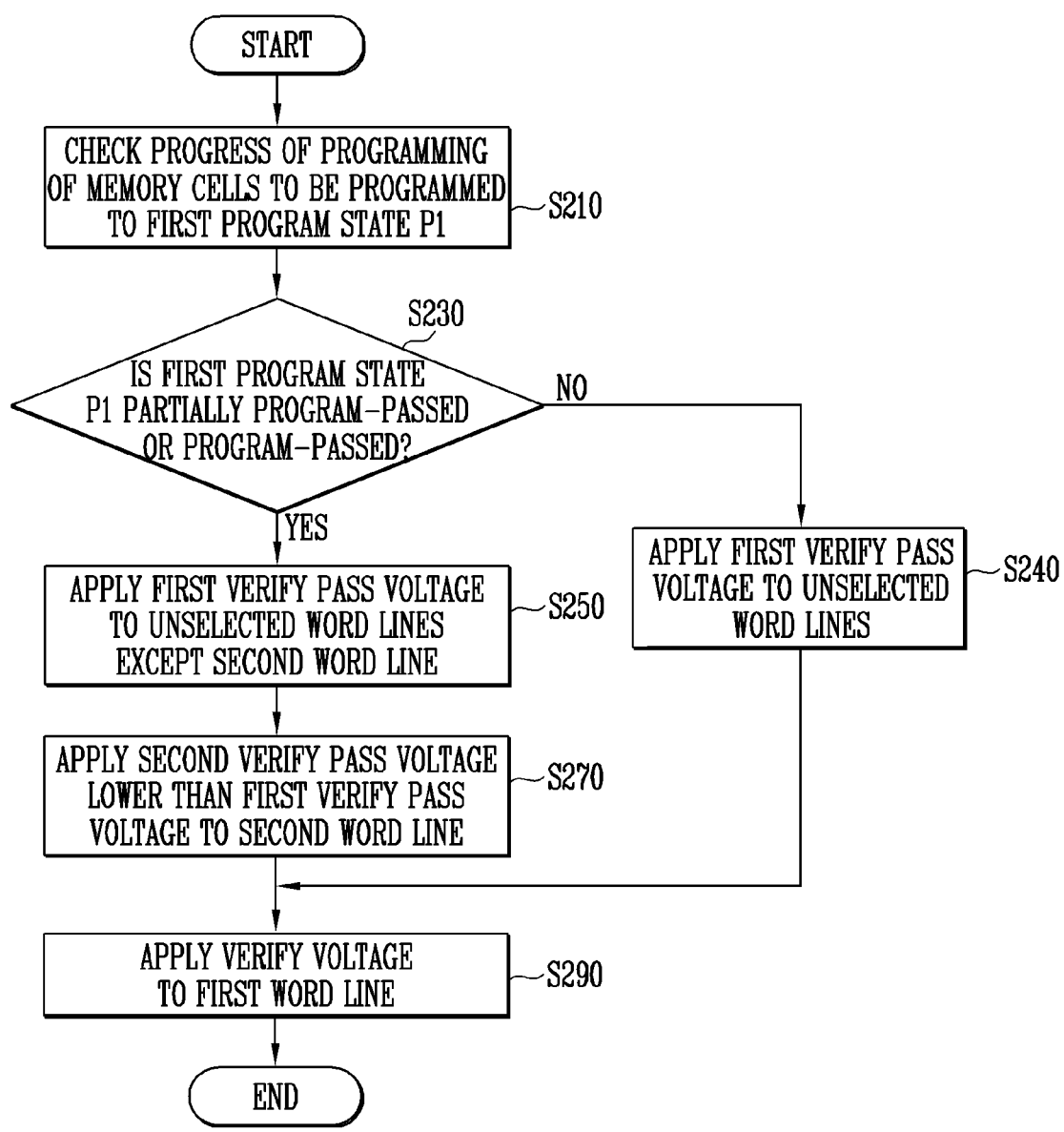

MEMORY DEVICE FOR PERFORMING FOGGY-FINE PROGRAM OPERATION AND METHOD OF OPERATING THE MEMORY DEVICE

CROSS-REFERENCE TO RELATED APPLICATION

The present application claims priority under 35 U.S.C. § 119(a) to Korean patent application number 10-2022-0153570 filed on Nov. 16, 2022, in the Korean Intellectual Property Office, the entire disclosure of which is incorporated by reference herein.

BACKGROUND

1. Technical Field

Various embodiments of the present disclosure generally relate to a memory device for performing a foggy-fine program operation and a method of operating the memory device.

2. Related Art

A memory device may have a two-dimensional (2D) structure in which strings are horizontally arranged on a semiconductor substrate. Alternatively, the memory device may have a three-dimensional (3D) structure in which strings are vertically stacked on a semiconductor substrate. Memory cells of the strings may be primarily programmed through a foggy program operation, and thereafter the memory cells may be secondarily programmed through a fine program operation. In order to form a threshold voltage distribution of memory cells in a narrow shape, the memory cells may be programmed using a foggy-fine program method. In this case, program disturb may be applied to the threshold voltages of memory cells adjacent to selected memory cells while a fine program operation is being performed on the selected memory cells.

SUMMARY

An embodiment of the present disclosure may provide for a memory device. The memory device may include a memory block including a plurality of memory cells, a peripheral circuit configured to perform a program operation on selected memory cells among the plurality of memory cells, and control logic configured to control the program operation performed by the peripheral circuit. The control logic may be configured to control the peripheral circuit to perform a foggy program operation on first memory cells coupled to a first word line, among the plurality of memory cells, perform a foggy program operation on second memory cells coupled to a second word line adjacent to the first word line, among the plurality of memory cells, and perform a fine program operation on the first memory cells by decreasing a verify pass voltage to be applied to the second word line.

An embodiment of the present disclosure may provide for a method of operating a memory device. The method may include performing a foggy program operation using a first verify pass voltage on first memory cells coupled to a first word line, performing a foggy program operation using the first verify pass voltage on second memory cells coupled to a second word line adjacent to the first word line, and performing a fine program operation on the first memory cells using the first verify pass voltage and a second verify pass voltage lower than the first verify pass voltage.

BRIEF DESCRIPTION OF THE DRAWINGS

FIG. 6 is a flowchart illustrating a method of operating a memory device according to an embodiment of the present disclosure.

FIG. 7 is a flowchart illustrating an embodiment of step S150 of FIG. 6.

FIG. 8 is a diagram illustrating the method of FIG. 7.

FIGS. 9A, 9B, and 9C are graphs illustrating a method of operating a memory device and the effect of the method according to an embodiment of the present disclosure.

FIG. 11 is a flowchart illustrating an embodiment of step S150 of FIG. 6.

DETAILED DESCRIPTION

Specific structural or functional descriptions in the embodiments of the present disclosure introduced in this specification or application are provided as examples to describe embodiments according to the concept of the present disclosure. The embodiments according to the concept of the present disclosure may be practiced in various forms, and should not be construed as being limited to the embodiments described in the specification or application.

Various embodiments of the present disclosure are directed to a memory device that is capable of reducing the time required for programming while decreasing program disturb during a foggy-fine program operation, and a method of operating the memory device.

Figure 1:
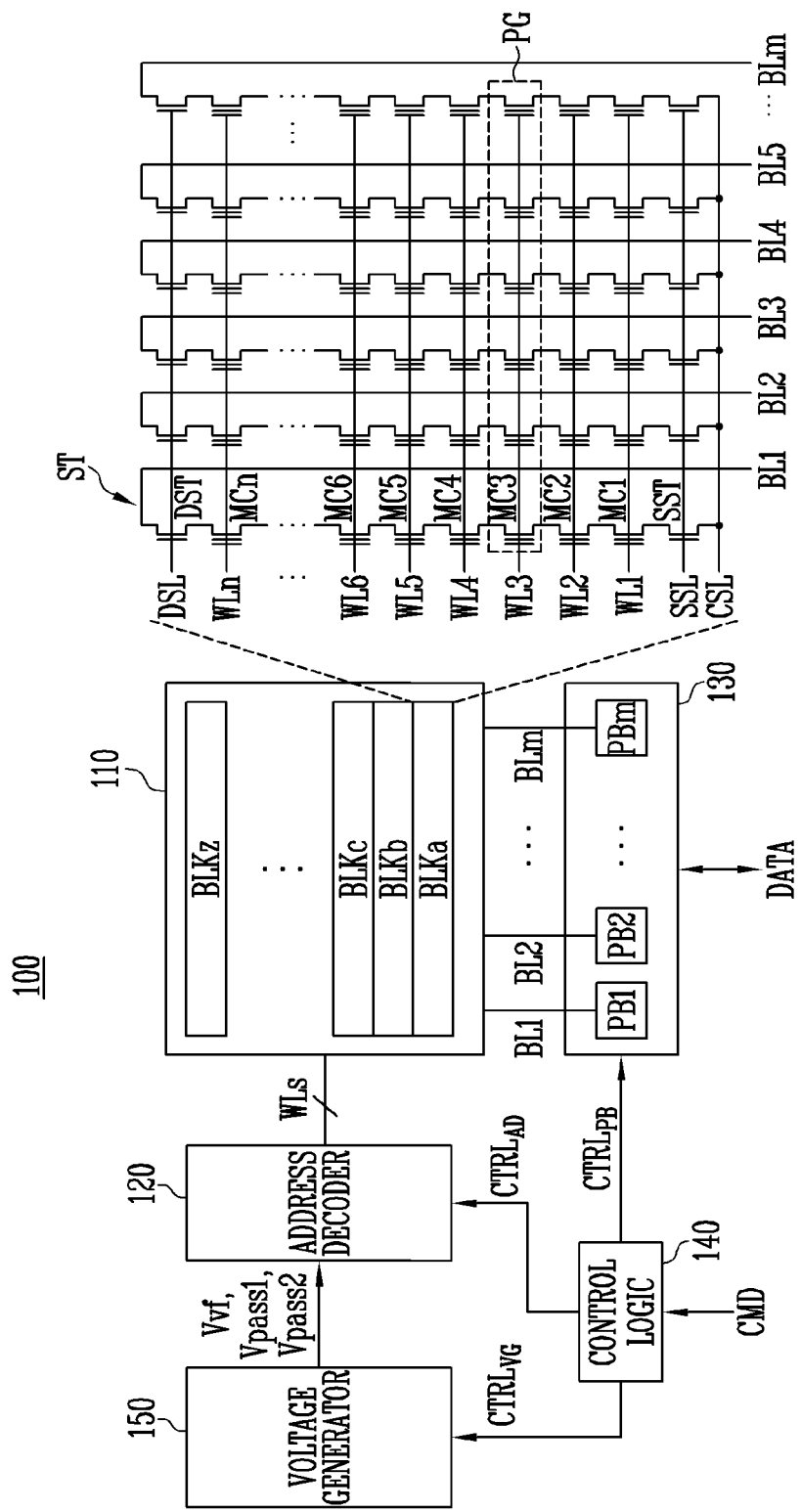
FIG. 1 is a diagram illustrating a semiconductor memory device according to an embodiment of the present disclosure.

FIG. 1 is a diagram illustrating a semiconductor memory device according to an embodiment of the present disclosure.

Referring to FIG. 1, a semiconductor memory device 100 may include a memory cell array 110, an address decoder 120, a read and write circuit 130, control logic 140, and a voltage generator 150. The control logic 140 may be implemented as hardware, software, or a combination of hardware and software. For example, the control logic 140 may be a control logic circuit operating in accordance with an algorithm and/or a processor executing control logic code.

The memory cell array 110 may include a plurality of memory blocks BLKa to BLKz. The memory blocks BLKa to BLKz are coupled to the address decoder 120 through word lines WLs. The memory blocks BLKa to BLKz are coupled to the read and write circuit 130 through bit lines BL1 to BLm. Each of the memory blocks BLKa to BLKz may include a plurality of memory cells. In an embodiment, the plurality of memory cells may be implemented as nonvolatile memory cells.

In FIG. 1, the structure of the memory block BLKa, among the plurality of memory blocks BLKa to BLKz included in the memory cell array, is illustrated. Referring to FIG. 1, a plurality of word lines WL1 to WLn arranged in parallel to each other may be coupled between a drain select line DSL and a source select line SSL. More specifically, the memory block BLKa may include a plurality of strings ST coupled between bit lines BL1 to BLm and a common source line CSL. The bit lines BL1 to BLm may be coupled to the corresponding strings ST, respectively, and the common source line CSL may be coupled in common to the strings ST. Because the strings ST may be equally configured, the string ST coupled to the first bit line BL1 will be described in detail by way of example.

The string ST may include a source select transistor SST, a plurality of memory cells MC1 to MCn, and a drain select transistor DST which are coupled in series to each other between the source line SL and the first bit line BL1. At least one source select transistor SST and at least one drain select transistor DST may be included in one string ST.

A source of the source select transistor SST may be coupled to the common source line CSL, and a drain of the drain select transistor DST may be coupled to the first bit line BL1. The memory cells MC1 to MCn may be coupled in series between the source select transistor SST and the drain select transistor DST. Gates of the source select transistors SST included in different strings ST may be coupled to the source select line SSL, gates of the drain select transistors DST included in different strings ST may be coupled to the drain select line DSL, and gates of the memory cells MC1 to MCn may be coupled to a plurality of word lines WL1 to WLn, respectively. A group of memory cells coupled to the same word line, among the memory cells included in different strings ST, may be referred to as a 'physical page (PG)'. Therefore, the memory block BLKa may include a number of physical pages (PG) identical to the number of word lines WL1 to WLn.

One memory cell may store one bit of data. This memory cell is typically designated as a "single-level cell (SLC)." In this case, one physical page (PG) may store data of one logical page (LPG). The data of one logical page (LPG) may include a number of data bits identical to the number of cells included in one physical page (PG).

Meanwhile, one memory cell may store two or more bits of data. In this case, one physical page (PG) may store data of two or more logical pages (LPG).

Although, in FIG. 1, the structure of a 2D memory block is illustrated, the present disclosure is not limited thereto. That is, each of the memory blocks BLKa to BLKz of FIG. 1 may also be implemented as a three-dimensional (3D) memory block.

The address decoder 120, the read and write circuit 130, and the voltage generator 150 are operated as a peripheral circuit for driving the memory cell array 110. The peripheral circuit may perform a read operation, a program operation, and an erase operation on the memory cell array 110 under the control of the control logic 140. The address decoder 120 is coupled to the memory cell array 110 through the word lines WLs. The address decoder 120 may be operated under the control of the control logic 140. In detail, the control logic 140 may transfer an address decoding control signal $CTRL_{AD}$ to the address decoder 120, and the address decoder 120 may perform a decoding operation in response to the address decoding control signal $CTRL_{AD}$.

Further, the address decoder 120 may apply a verify voltage Vvf, generated by the voltage generator 150, to a selected word line coupled to a selected memory block and apply a first verify pass voltage Vpass1 to the remaining word lines, that is, unselected word lines, during a verify operation included in a foggy program operation. Furthermore, the address decoder 120 may apply the verify voltage Vvf, generated by the voltage generator 150, to a selected word line coupled to a selected memory block, apply a second verify pass voltage Vpass2 to an unselected word line disposed adjacent to the selected word line, and apply the first verify pass voltage Vpass1 to the remaining unselected word lines, during a verify operation included in a fine program operation. Here, the second verify pass voltage Vpass2 may be a voltage lower than the first verify pass voltage Vpass1.

The read and write circuit 130 includes a plurality of page buffers PB1 to PBm. The read and write circuit 130 may be operated as a "read circuit" during a read operation on the memory cell array 110 and as a "write circuit" during a write operation on the memory cell array 110. The plurality of page buffers PB1 to PBm may be coupled to the memory cell array 110 through the bit lines BL1 to BLm. The read and write circuit 130 may perform a program operation on received data DATA in response to a page buffer control signal $CTRL_{PB}$ output from the control logic 140.

The control logic 140 is coupled to the address decoder 120, the read and write circuit 130, and the voltage generator 150. The control logic 140 may receive a command CMD from an external device. The control logic 140 may control the address decoder 120, the read and write circuit 130, and the voltage generator 150 to perform an operation corresponding to the received command CMD. That is, the control logic 140 may control the operation of the voltage generator 150 using a voltage generation control signal $CTRL_{VG}$. Also, the control logic 140 may control the operation of the address decoder 120 using the address decoding control signal $CTRL_{AD}$. Meanwhile, the control logic 140 may control the operations of the page buffers PB1 to PBm in the read and write circuit 130 using the page buffer control signal $CTRL_{PB}$.

The voltage generator 150 may generate various operating voltages in response to the voltage generation control signal $CTRL_{VG}$ output from the control logic 140. For example, the voltage generator 150 may generate the verify voltage Vvf, the first verify pass voltage Vpass1, and the second verify pass voltage Vpass2 that are used for a verify operation included in a program operation. Furthermore, the voltage generator 150 may also generate a program voltage Vpgm and a program pass voltage.

During a foggy program operation on the selected memory cells, the voltage generator 150 may transfer the verify voltage Vvf and the first verify pass voltage Vpass1 to the address decoder 120. Also, during a fine program operation on the selected memory cells, the voltage generator 150 may transfer the verify voltage Vvf, the first verify pass voltage Vpass1, and the second verify pass voltage Vpass2 to the address decoder 120.

The program operation may be performed on a page basis. Memory cells coupled in common to one word line may form a physical page. In an embodiment, the physical page may include one or more logical pages. Therefore, page data indicating data stored in the physical page may include data of one or more logical pages. For example, when each memory cell is programmed in an SLC mode, the physical page may include one logical page, and page data may include data of one logical page. Alternatively, when the memory cell is programmed in an MLC mode, the physical page may include two logical pages, and page data may include data of two logical pages. Here, the data of two logical pages may be least significant bit (LSB) page data and most significant bit (MSB) page data. Alternatively, when the memory cell is programmed in a TLC mode, the physical page may include three logical pages, and page data may include data of three logical pages. Here, the data of three logical pages may be least significant bit (LSB) page data, central significant bit (CSB) page data, and most significant bit (MSB) page data.

Hereinafter, for convenience of description, a description will be made on the assumption that each memory cell is programmed in a TLC mode. However, this is provided only for convenience of description, and an embodiment of the present disclosure is not limited thereto.

Before a program operation is performed, the memory cells may have threshold voltages corresponding to an erase state. When the program operation is performed, memory cells included in a selected page may have threshold voltages corresponding to any one of the erase state and first to seventh program states depending on data stored in each memory cell. In detail, depending on the data to be stored in each memory cell, the corresponding memory cell may have any one of the erase state and the first to seventh program states as a target program state. The program operation may be performed on each memory cell so that the corresponding memory cell has a threshold voltage in the target program state.

In an embodiment, the program operation may be performed on the memory cells using a so-called "one-shot program scheme." The one-shot program scheme may include a plurality of program loops. One program loop may include a program voltage apply step of applying a program voltage to a selected word line and a verify step of sensing whether the threshold voltage of each memory cell has reached a threshold voltage corresponding to the target program state. Whenever another program loop is performed for the current program operation, the magnitude of a program voltage applied to a word line may be increased by a step voltage from a program voltage in a previous program loop. Here, the step voltage may be a preset voltage value. This is referred to as an incremental step pulse programming (ISPP) scheme. When all memory cells coupled to the selected word line do not reach the target program states even if a number of program loops corresponding to the preset maximum number of loops have been performed, it may be determined that the program operation has failed.

In other embodiments, the program operation may include a first program operation and a second program operation. The first program operation may be an operation of allowing the memory cells to have threshold voltages corresponding to any one of an erase state and an intermediate state. The second program operation may be a program operation of allowing memory cells belonging to the erase state or the intermediate state to have threshold voltages corresponding to any one of the erase state and the first to seventh program states. Because this program scheme is configured such that, when the first program operation is performed, the number of threshold voltage distributions formed by memory cells is 2, and when the second program operation is performed, the number of threshold voltage distributions formed by the memory cells is 8, it may also be referred to as a '2-8 program scheme'.

In the present specification, the first program operation may be referred to as a "foggy program operation." By the foggy program operation, the threshold voltages of memory cells belong to any one of the erase state and the intermediate state. More specifically, by the foggy program operation, memory cells are programmed such that the threshold voltages of memory cells to be programmed to a higher state belong to the intermediate state. On the other hand, during the foggy program operation, the threshold voltages of memory cells to be programmed to a lower state may be maintained in the erase state.

Meanwhile, in the present specification, the second program operation may be referred to as a "fine program operation." By the fine program operation, the threshold voltages of memory cells may belong to any one of the erase state and the first to seventh program states. More specifically, by the fine program operation, memory cells are programmed such that the threshold voltages of memory cells in the intermediate state belong to a higher state. Further, by the fine program operation, memory cells are programmed such that the threshold voltages of memory cells in the erase state belong to a lower state.

In the present specification, a plurality of program states belonging to the higher state may have threshold voltages higher than those in a plurality of program states belonging to the lower state. The higher state and the lower state may be determined in various manners as occasion demands. In an example, the program states may be determined such that the fourth to seventh program states indicate the higher state, and the erase state and the first to third program states indicate the lower state. In an example, the program states may be determined such that the fifth to seventh program states indicate the higher state, and the erase state and the first to fourth program states indicate the lower state. In an example, the program states may be determined such that the third to seventh program states indicate the higher state, and the erase state and the first and second program states indicate the lower state.

Figure 2:
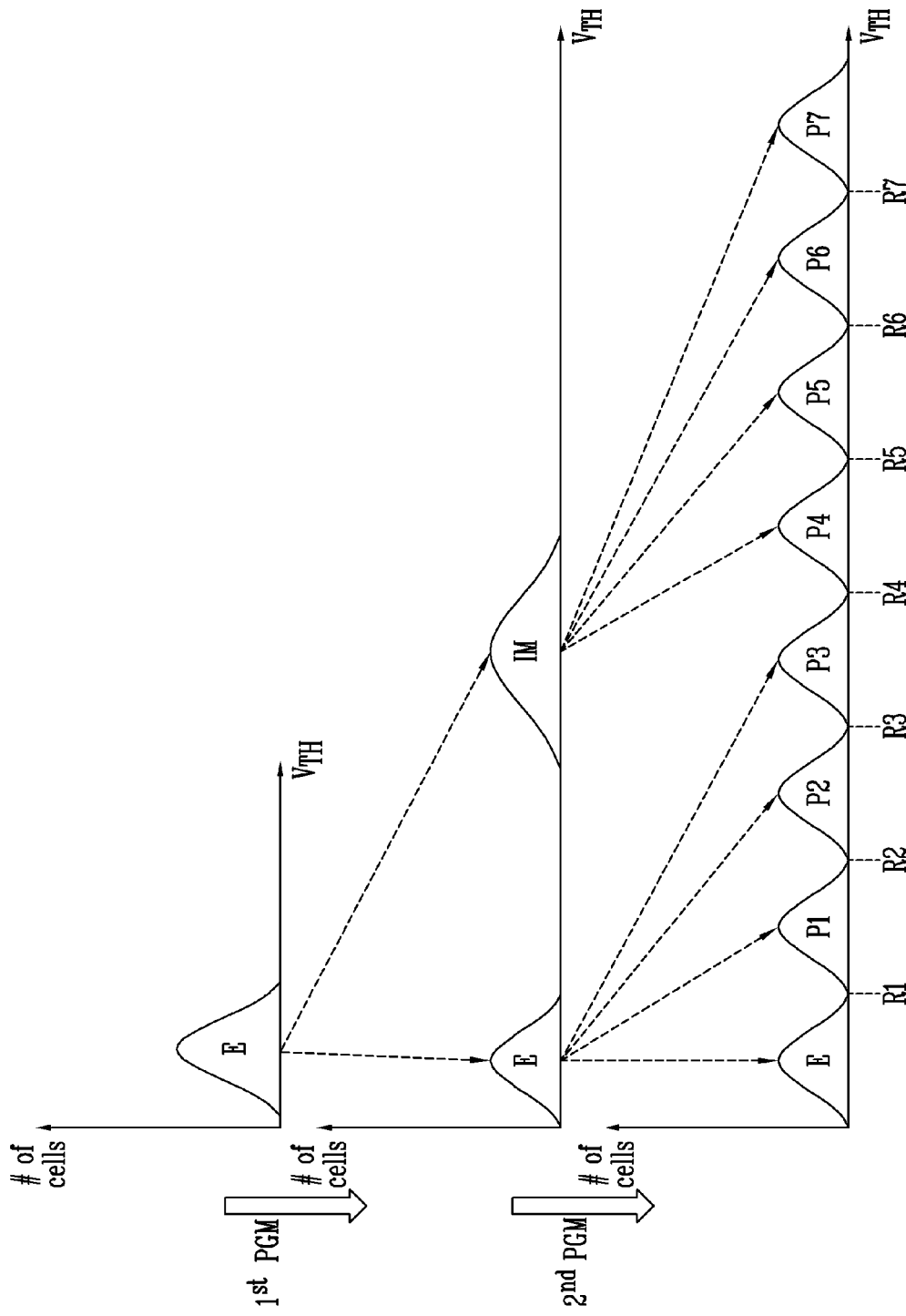
FIG. 2 is a diagram illustrating a program operation according to an embodiment of the present disclosure.

FIG. 2 is a diagram illustrating a program operation according to an embodiment of the present disclosure.

Referring to FIG. 2, a first program operation may be an operation of programming memory cells coupled to a selected word line so that each of the memory cells has a threshold voltage corresponding to any one of an erase state E and an intermediate state IM depending on the data to be stored in the corresponding memory cell. In an embodiment, the magnitude of a threshold voltage corresponding to the intermediate state IM may be greater than that of a threshold voltage corresponding to the erase state E. In an embodiment, each of memory cells to be programmed to the intermediate state IM in the first program operation may be a memory cell having any one of fourth to seventh program states P4 to P7 as the target program state. On the other hand, the target program state of each memory cell to be maintained in the erase state E in the first program operation may be any one of the erase state E and first to third program states P1 to P3. First to seventh read voltages R1 to R7 may be read voltages for distinguishing the erase state E and the first to seventh program states P1 to P7 from each other.

In an embodiment, the first program operation $1^{st}$ PGM may be an operation of providing a fixed program voltage having a preset magnitude to memory cells one or more times. That is, the simplest form of the first program operation $1^{st}$ PGM may be an operation of providing the fixed program voltage to a word line once. In an embodiment, the first program operation 1$^{st}$ PGM may also include a plurality of program loops. In this case, even if the program loops included in the first program operation 1$^{st}$ PGM are performed, the program voltage applied to the word line may be a fixed program voltage having a fixed voltage level without the level of the program voltage increasing. In an embodiment, the first program operation 1$^{st}$ PGM may include a program operation in which a verify step is not performed. In an embodiment, the verify step may be performed during the first program operation 1$^{st}$ PGM.

Any one of a program-enable voltage and a program-inhibit voltage may be applied to respective bit lines to which selected memory cells are coupled while the fixed program voltage is being applied to the word line. For example, the threshold voltages of memory cells to which the program-enable voltage is applied may be voltages corresponding to the intermediate state IM with the application of the fixed program voltage. In contrast, the threshold voltages of the memory cells to which the program-inhibit voltage is applied may be maintained in the erase state E.

A second program operation 2$^{nd}$ PGM may be an operation of programming memory cells so that memory cells having threshold voltages corresponding to the erase state E and the intermediate state IM have threshold voltages corresponding to respective target program states.

When the second program operation 2$^{nd}$ PGM is performed, the memory cells that are maintained in the erase state E in the first program operation 1$^{st}$ PGM may have threshold voltages corresponding to any one of the first to third program states P1 to P3. Alternatively, the memory cells programmed to the intermediate state IM in the first program operation may have threshold voltages corresponding to any one of the fourth to seventh program states P4 to P7.

Figure 3:
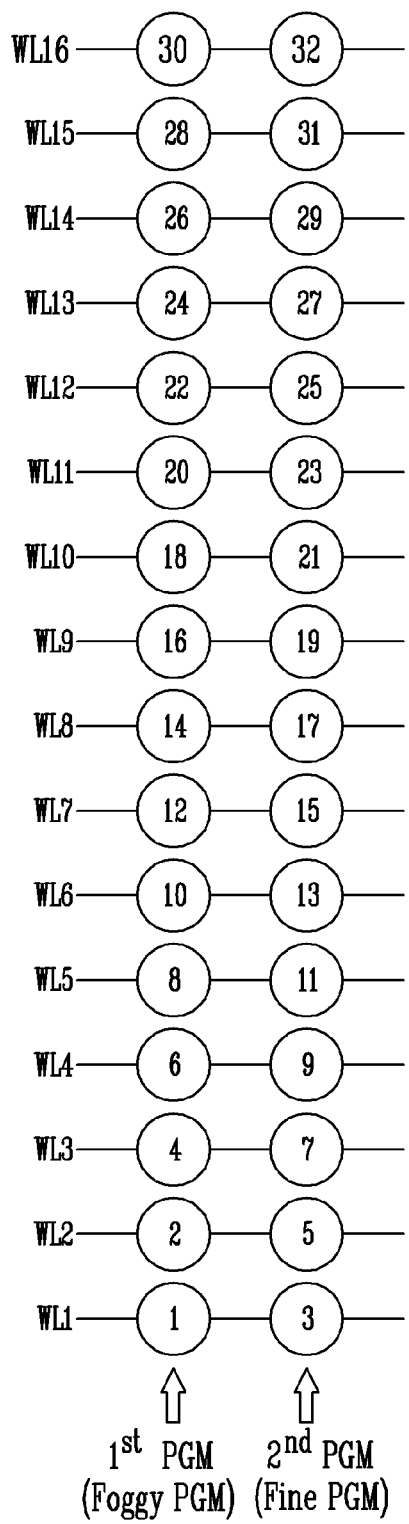
FIG. 3 is a diagram illustrating the order in which first and second program operations are performed on respective physical pages.

FIG. 3 is a diagram illustrating the order in which first and second program operations are performed on respective physical pages. For convenience of description, only first to sixteenth word lines WL1 to WL16, among first to n-th word lines WL1 to WLn, are illustrated.

Referring to FIG. 3, the order in which a first program operation 1$^{st}$ PGM and a second program operation 2$^{nd}$ PGM are performed on each of the physical pages coupled to the first to sixteenth word lines WL1 to WL16 is indicated by numerals in the corresponding circles. In order to minimize the influence of program disturb on the memory cells in an adjacent page during the second program operation 2$^{nd}$ PGM, the order of the entire program operation may be determined such that, after the first program operation 1$^{st}$ PGM on the adjacent physical page is completed, the second program operation 2$^{nd}$ PGM is performed on the corresponding physical page.

First, a first program operation 1$^{st}$ PGM is performed first on a physical page coupled to the first word line WL1. Thereafter, the first program operation 1$^{st}$ PGM is performed second on a physical page coupled to the second word line WL2 rather than a second program operation being performed on the physical page coupled to the first word line WL1. Thereafter, a second program operation 2$^{nd}$ PGM is performed third on the physical page coupled to the first word line WL1.

Thereafter, a first program operation 1$^{st}$ PGM is performed fourth on a physical page coupled to the third word line WL3, and a second program operation 2$^{nd}$ PGM is performed fifth on the physical page coupled to the second word line WL2. When these operations are generalized, it can be seen that, before a second program operation 2$^{nd}$ PGM is performed on an i-th word line WLi (where i is a natural number equal to or greater than 1), a first program operation 1$^{st}$ PGM is performed on an (i+1)-th word line WL(i+1).

Figure 4:
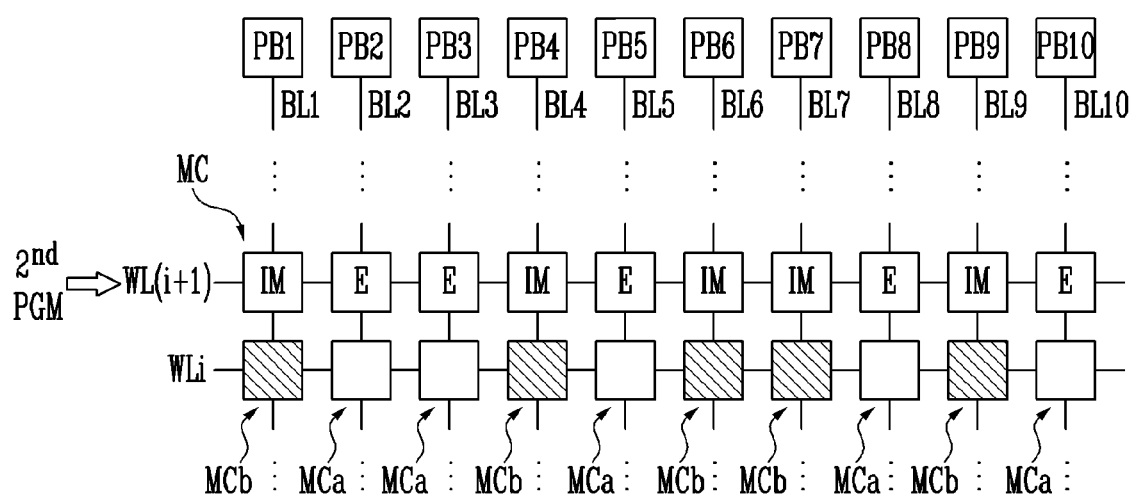
FIGS. 4, 5A, and 5B are diagrams illustrating the influence of program disturb during a second program operation on adjacent memory cells.
Figure 5A:
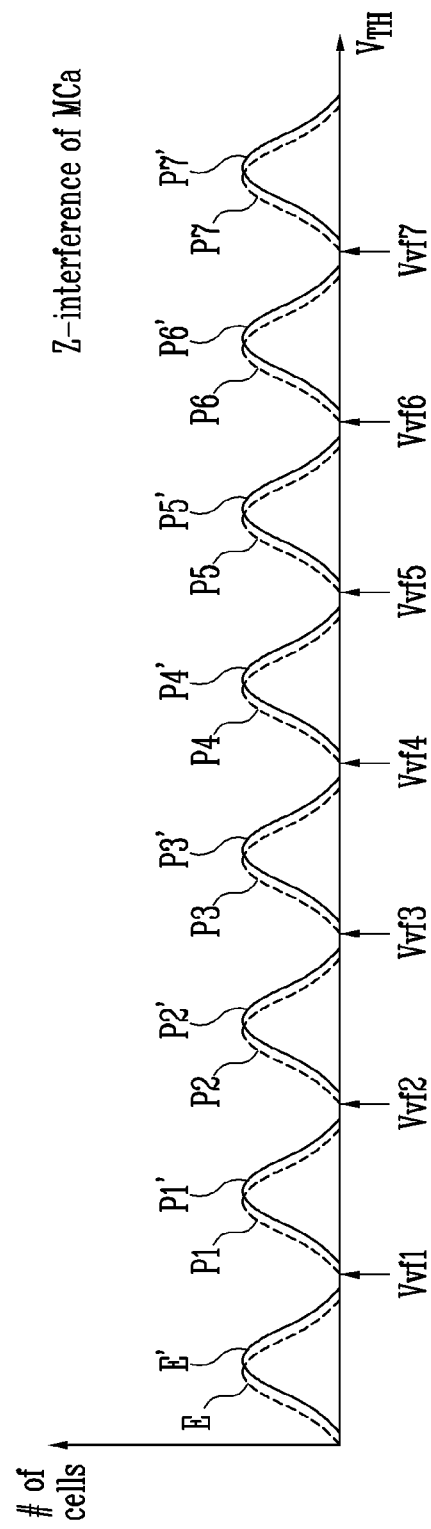
Figure 5B:
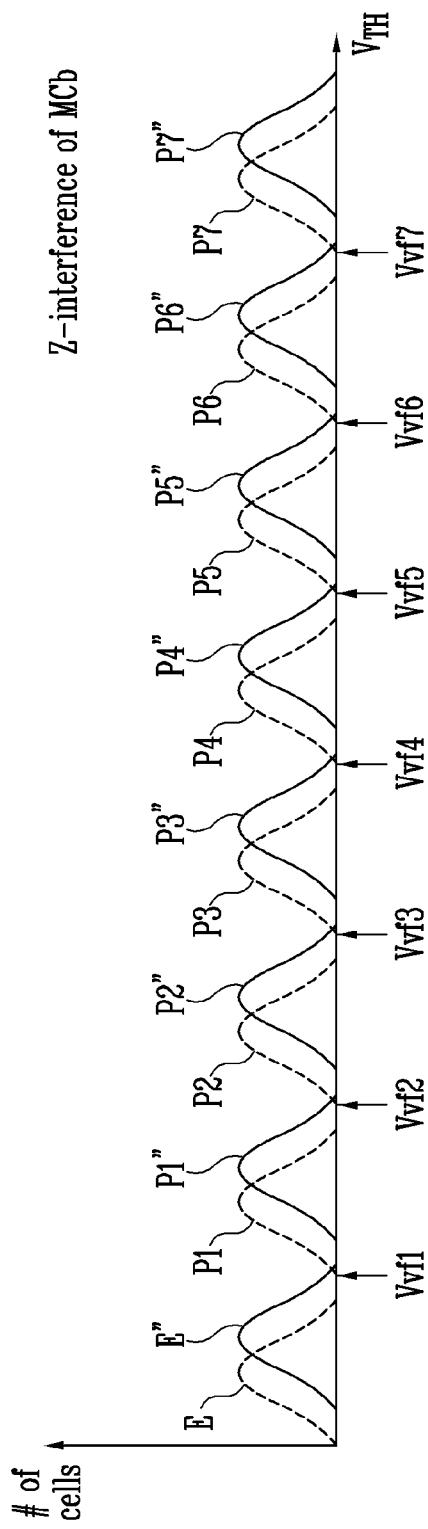

FIGS. 4, 5A, and 5B are diagrams illustrating the influence of program disturb during a second program operation on adjacent memory cells.

Referring to FIG. 4, a drawing is illustrated to describe disturb applied to memory cells coupled to an i-th word line WLi during a second program operation 2$^{nd}$ PGM on a physical page coupled to an (i+1)-th word line WL(i+1) in the state in which a first program operation 1$^{st}$ PGM and a second program operation 2$^{nd}$ PGM performed on a physical page coupled to the i-th word line WLi are completed and a first program operation 1st PGM performed on a physical page coupled to the (i+1)-th word line WL(i+1) is completed.

For convenience of description, only memory cells MC coupled to the i-th word line WLi and the (i+1)-th word line WL(i+1), among memory cells included in the memory block, are illustrated. Referring to FIG. 4, each memory cell is coupled to any one of first to tenth bit lines BL1 to BL10, and the first to tenth bit lines BL1 to BL10 are coupled to first to tenth page buffers PB1 to PB10, respectively.

As described above, the first program operation 1$^{st}$ PGM and the second program operation 2$^{nd}$ PGM performed on the physical page coupled to the i-th word line WLi are completed, and the first program operation 1$^{st}$ PGM performed on the physical page coupled to the (i+1)-th word line WL(i+1) is completed. In squares indicating memory cells MC coupled to the (i+1)-th word line WL(i+1), the results of the first program operation 1$^{st}$ PGM performed on the corresponding memory cells are written.

For example, among the memory cells MC coupled to the (i+1)-th word line WL(i+1), a memory cell coupled to the first bit line BL1 is programmed to an intermediate state IM as a result of the first program operation 1$^{st}$ PGM. Further, among the memory cells MC coupled to the (i+1)-th word line WL(i+1), a memory cell coupled to the second bit line BL2 is maintained in an erase state E as a result of the first program operation 1$^{st}$ PGM. In this way, among the memory cells MC coupled to the (i+1)-th word line WL(i+1), memory cells coupled to the fourth, sixth, seventh, and ninth bit lines BL4, BL6, BL7, and BL9 are programmed to the intermediate state IM as a result of the first program operation 1$^{st}$ PGM. Furthermore, among the memory cells MC coupled to the (i+1)-th word line WL(i+1), memory cells coupled to the third, fifth, eighth, and tenth bit lines BL3, BL5, BL8, and BL10 are maintained in the erase state E as a result of the first program operation 1$^{st}$ PGM.

As described above, the memory cells programmed to the intermediate state IM through the first program operation 1$^{st}$ PGM may be programmed to a higher state through a subsequent second program operation 2$^{nd}$ PGM. Meanwhile, the memory cells maintained in the erase state E through the first program operation 1$^{st}$ PGM may be programmed to a lower state through a subsequent second program operation 2$^{nd}$ PGM. Memory cells adjacent in the direction of bit lines to the memory cells to be programmed to the higher state through the second program operation 2$^{nd}$ PGM are more affected by disturb. This means that, among the memory cells coupled to the i-th word line WLi illustrated in FIG. 4, memory cells MCb indicated by hatched squares are more affected by disturb than other memory cells MCa. After the second program operation 2$^{nd}$ PGM performed on the memory cells coupled to the (i+1)-th word line WL(i+1) is completed, the threshold voltages of memory cells MCb may be relatively increased due to disturb compared to the threshold voltages of the memory cells MCa.

Referring to FIG. 5A, Z-interference applied to memory cells MCa adjacent to the memory cells in the erase state E is illustrated. In the present specification, the term "Z-interference" may be program disturb applied to memory cells adjacent in the direction of bit lines to memory cells in the erase state during a fine program on the memory cells. In FIG. 5A, before a second program operation $2^{nd}$ PGM on memory cells coupled to the (i+1)-th word line WL(i+1), threshold voltage distributions of memory cells coupled to the i-th word line WLi may form the erase state E and the first to seventh program states P1 to P7.

By the second program operation $2^{nd}$ PGM on the memory cells coupled to the (i+1)-th word line WL(i+1), the threshold voltage distributions of the memory cells MCa coupled to the i-th word line WLi may be changed. That is, the threshold voltage distributions of the memory cells MCa coupled to the i-th word line WLi may be changed to an erase state E' and first to seventh program states P1' to P7'.

Meanwhile, referring to FIG. 5B, Z-interference applied to memory cells MCb adjacent to memory cells in the intermediate state IM is illustrated. In FIG. 5B, before a second program operation $2^{nd}$ PGM on memory cells coupled to the (i+1)-th word line WL(i+1), threshold voltage distributions of memory cells coupled to the i-th word line WLi may form the erase state E and the first to seventh program states P1 to P7.

By the second program operation $2^{nd}$ PGM on the memory cells coupled to the (i+1)-th word line WL(i+1), the threshold voltage distributions of the memory cells MCb coupled to the i-th word line WLi may be changed. That is, the threshold voltage distributions of the memory cells MCb coupled to the i-th word line WLi may be changed to an erase state E" and first to seventh program states P1" to P7".

Referring to FIGS. 5A and 5B together, it can be seen that the influence of Z-interference on the memory cells MCb is greater than that of Z-interference on the memory cells MCa. The influence of the Z-interference becomes the cause of deteriorating the threshold voltage distributions of all memory cells MCa and MCb coupled to the i-th word line WLi.

In accordance with an embodiment of the present disclosure, in order to mitigate the influence of selective disturb, the magnitude of a verify pass voltage applied to the (i+1)-th word line WL(i+1) may be decreased during the second program operation $2^{nd}$ PGM on the memory cells coupled to the i-th word line WLi. Accordingly, the difference between the strengths of disturb applied to the memory cells MCa and MCb during the second program operation $2^{nd}$ PGM on the memory cells coupled to the (i+1)-th word line WL(i+1) may be cancelled.

FIG. 6 is a flowchart illustrating a method of operating a memory device according to an embodiment of the present disclosure.

Referring to FIG. 6, the method of operating the memory device according to the embodiment of the present disclosure may include performing a foggy program operation on first memory cells coupled to a first word line at step S110, performing a foggy program operation on second memory cells coupled to a second word line at step S130, and performing a fine program operation on the first memory cells by decreasing a verify pass voltage to be applied to the second word line at step S150.

Step S110 may correspond to a first program operation 1st PGM on a physical page coupled to an i-th word line WLi. Here, the first word line may correspond to the i-th word line WLi illustrated in FIG. 4. As described earlier, the first program operation may correspond to "foggy program operation."

Step S130 may correspond to a first program operation 1st PGM on a physical page coupled to an (i+1)-th word line WL(i+1). Here, the second word line may correspond to the (i+1)-th word line WL(i+1) illustrated in FIG. 4. That is, the second word line may be disposed adjacent to the first word line.

Therefore, each of the first memory cells coupled to the first word line may be disposed adjacent, in the direction of bit lines, to the corresponding memory cell, among the second memory cells coupled to the second word line.

Step S150 may correspond to a second program operation $2^{nd}$ PGM on the physical page coupled to the i-th word line WLi. As described earlier, the second program operation may correspond to "fine program operation." The second program operation at step S150 may include a plurality of program loops. Each program loop may include a verify operation. In the verify operation performed at step S150, the verify pass voltage to be applied to the second word line, i.e. the (i+1)-th word line WL(i+1), may be decreased from the verify pass voltage applied to other unselected word lines. By means of this operation, the difference between disturb applied to the memory cell MCa of the first word line or i-th word line WLi disposed adjacent to a memory cell in the erase state E of the second word line or (i+1)-th word line WL(i+1) and disturb applied to the memory cell MCb of the first word line or i-th word line WLi disposed adjacent to a memory cell in the intermediate state IM of the second word line or (i+1)-th word line WL(i+1) may be decreased. Consequently, deterioration of the threshold voltage distribution of first memory cells, that occurs during the fine program operation performed on the memory cells coupled to the (i+1)-th word line WL(i+1) after step (S150), may be minimized.

Meanwhile, although not illustrated in FIG. 6, the method of operating the memory device according to an embodiment of the present disclosure may further include performing a fine program operation on the second memory cells after step S150. More specifically, the method of operating the memory device according to an embodiment of the present disclosure may further include, after step S150, performing a foggy program operation on third memory cells coupled to a third word line and performing a fine program operation on the second memory cells based on the threshold voltages of the third memory cells.

FIG. 7 is a flowchart illustrating an embodiment of step S150 of FIG. 6.

Referring to FIG. 7, step S150 of FIG. 6 may include applying a first verify pass voltage to unselected word lines except the second word line at step S151, applying a second verify pass voltage lower than the first verify pass voltage to the second word line at step S153, and applying a verify voltage to the first word line at step S155.

At step S151, the first verify pass voltage may be applied to the unselected word lines except the second word line, among the unselected word lines other than the first word line, which is the currently selected word line. The first verify pass voltage may be a verify pass voltage used for a normal verify operation.

At step S153, the second verify pass voltage may be applied to the second word line, among the unselected word lines. The second verify pass voltage may have a value less than that of the first verify pass voltage.

In FIG. 7, step S153 is illustrated as being performed after step S151. However, the present disclosure is not limited thereto, and step S151 may be performed after step S153, according to an embodiment. In an embodiment, steps S151 and S153 may be performed substantially simultaneously.

Meanwhile, at step S155, the verify voltage may be applied to the first word line. Whether the threshold voltages of at least some of the first memory cells coupled to the first word line are higher than the verify voltage may be determined by performing step S155. The verify voltage at step S155 may be at least one of the first to seventh verify voltages Vvf1 to Vvf7 illustrated in FIGS. 5A and 5B.

As illustrated in FIG. 7, in accordance with an embodiment of the present disclosure, during the fine program operation on the first memory cells coupled to the first word line at step S150, the first verify pass voltage may be applied to the unselected word lines except the second word line, and the second verify pass voltage having a decreased level may be applied to the second word line adjacent to the first word line.

FIG. 8 is a diagram illustrating the method of FIG. 7. Hereinafter, a description will be made with reference to FIGS. 7 and 8 together.

Referring to FIG. 8, a fine program operation performed on memory cells coupled to a tenth word line WL10 is illustrated. In FIG. 8, program operations performed on memory cells coupled to first to ninth word lines WL1 to WL9 have been completed. Meanwhile, although a foggy program operation performed on memory cells coupled to an eleventh word line WL11 has been completed in FIG. 8, a fine program operation performed on the memory cells coupled to the eleventh word line WL11 is not yet performed.

During a verify operation of the fine program operation (step S150) performed on the memory cells coupled to the tenth word line WL10, the first verify pass voltage Vpass1 may be applied to unselected word lines WL1 to WL9 and WL12 to WL16, other than the eleventh word line WL11 coupled to the memory cells on which only the foggy program operation is completed, among the unselected word lines WL1 to WL9 and WL11 to WL16, at step S151, and the second verify pass voltage Vpass2 may be applied to the eleventh word line WL11 at step S153. Thereafter, a verify voltage Vvf may be applied to the tenth word line WL10, which is the selected word line.

Accordingly, the difference between disturb applied to the memory cell MCa, which is disposed adjacent to the memory cell in the erase state E coupled to the eleventh word line WL11 among the memory cells coupled to the tenth word line WL10, and disturb applied to the memory cell MCb, which is disposed adjacent to the memory cell in the intermediate state IM coupled to the eleventh word line WL11 among the memory cells coupled to the tenth word line WL10, may be reduced. Consequently, deterioration of the threshold voltage distributions of the memory cells coupled to the tenth word line WL10 may be minimized due to the subsequent fine program operation performed on the memory cells coupled to the eleventh word line WL11. Hereinafter, a description will be made with reference to FIGS. 9A to 9C.

Figure 9B:
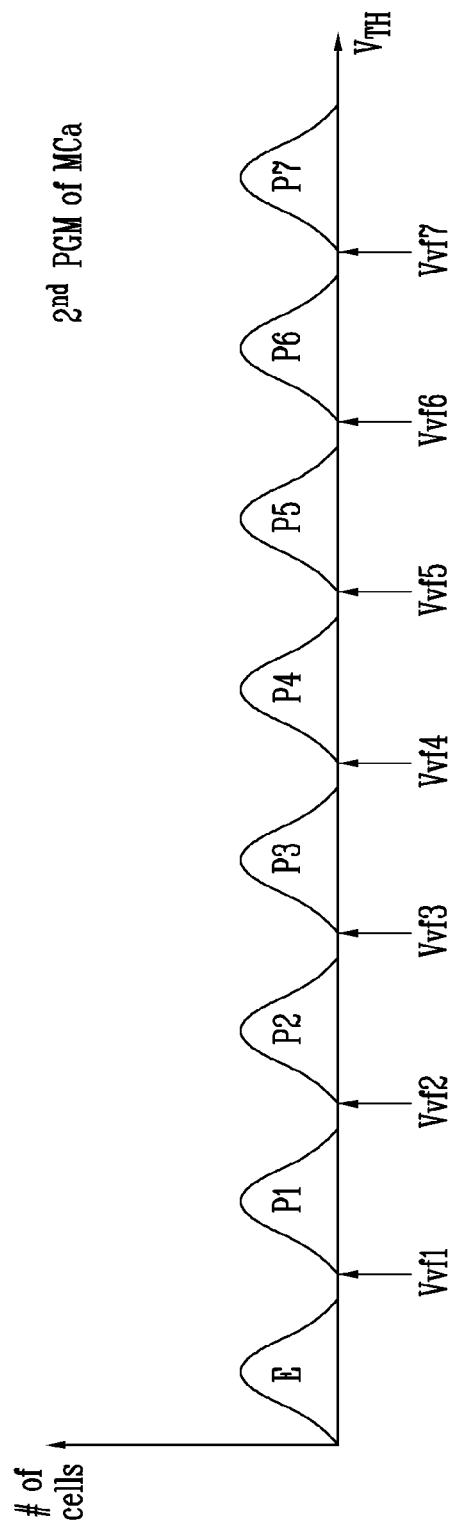
Figure 9C:
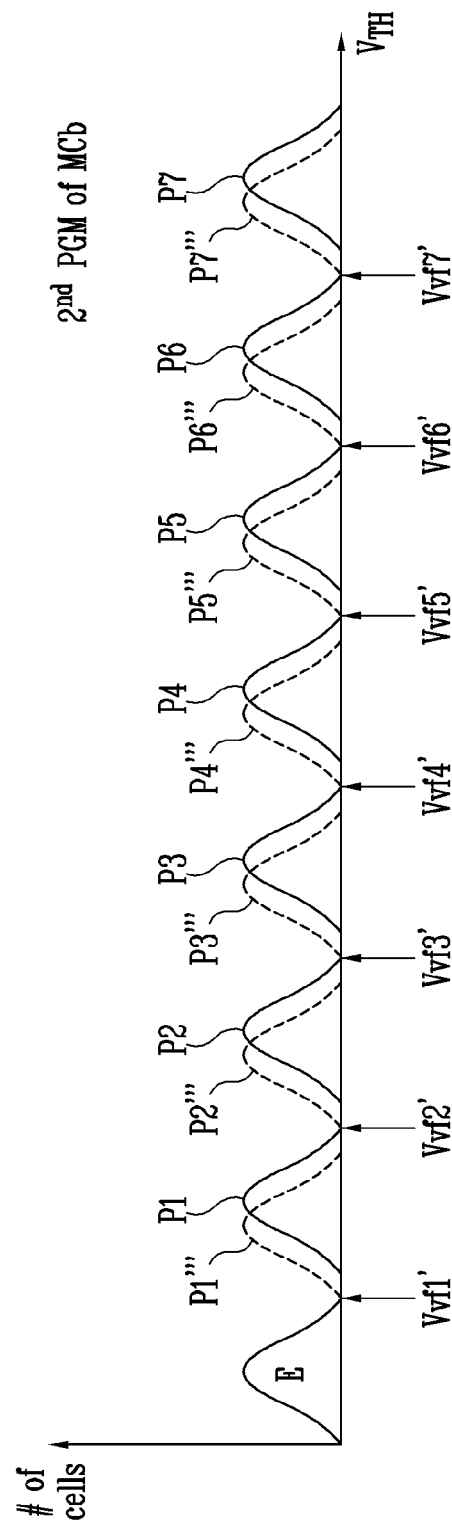

FIGS. 9A, 9B, and 9C are graphs illustrating a method of operating a memory device and the effect of the method according to an embodiment of the present disclosure. First, in FIG. 9A, threshold voltage distributions of memory cells coupled to the eleventh word line WL11 on which a foggy program operation is completed are illustrated. During the foggy program operation, the memory cells coupled to the eleventh word line WL11 are programmed using an intermediate verify voltage $Vvf_{IM}$. Meanwhile, in FIG. 9A, a first verify pass voltage Vpass1 and a second verify pass voltage Vpass2 are depicted together.

When the verify pass voltage to be applied to the eleventh word line WL11 is decreased during the verify operation on the memory cells coupled to the tenth word line WL10, current flowing through the channel of each string may change. In detail, the current flowing through the channel of each string in the case where the second verify pass voltage Vpass2 is applied to the eleventh word line WL11 may be less than current flowing through the channel of each string in the case where the first verify pass voltage Vpass1 is applied to the eleventh word line WL11. This means that the threshold voltages of memory cells coupled to the tenth word line WL10 are determined to be relatively high in the verify operation. In other words, when the verify pass voltage to be applied to the eleventh word line WL11 is decreased during the verify operation on the memory cells coupled to the tenth word line WL10, an effect substantially identical to that when the verify voltage to be applied to the tenth word line WL10 is decreased may be obtained.

Meanwhile, the decrease in the verify pass voltage to be applied to the eleventh word line WL11 varies influence on the determination of the threshold voltages of memory cells coupled to the tenth word line WL10 depending on the magnitudes of the threshold voltages of the memory cells coupled to the eleventh word line WL11. This process will be described below from the standpoint of a channel current. When the verify pass voltage to be applied to the eleventh word line WL11 is decreased during the verify operation on the memory cells coupled to the tenth word line WL10, the range of decrease in the channel current of strings coupled to memory cells in the erase state E, among the memory cells coupled to the eleventh word line WL11 is relatively narrow. On the other hand, when the verify pass voltage to be applied to the eleventh word line WL11 is decreased during the verify operation on the memory cells coupled to the tenth word line WL10, the range of decrease in the channel current of strings coupled to memory cells in the intermediate state IM, among the memory cells coupled to the eleventh word line WL11 is relatively wide.

This means that the degree of recognition that the threshold voltages of memory cells coupled to the eleventh word line WL11 are located in a relatively right portion varies depending on the threshold voltages of the memory cells disposed adjacent thereto. A description will be made with reference to FIGS. 9B and 9C.

In FIG. 9B, the influence of a decrease in the verify pass voltage to be applied to the tenth word line WL10 on a verify operation performed on memory cells MCa disposed adjacent to memory cells in an erase state E is illustrated. Referring to FIG. 9A, the threshold voltages of the memory cells in the erase state E are located relatively far away from first and second verify pass voltages Vpass1 and Vpass2. Accordingly, in an embodiment, even if the second verify pass voltage Vpass2 instead of the first verify pass voltage Vpass1 is applied to the tenth word line WL10, the channel current of strings in which memory cells coupled to the eleventh word line WL11 are memory cells in the erase state E hardly changes. That is, in an embodiment, even if the verify pass voltage to be applied to the tenth word line WL10 is decreased, influence on the verify operation performed on memory cells adjacent to the memory cells in the erase state E is not actually present.

Meanwhile, in FIG. 9C, the influence of a decrease in the verify pass voltage to be applied to the tenth word line WL10 on a verify operation performed on memory cells MCa disposed adjacent to memory cells in the intermediate state IM is illustrated. Referring to FIG. 9A, the threshold voltages of memory cells in the intermediate state IM are located relatively close to first and second verify pass voltages Vpass1 and Vpass2. Accordingly, when the second verify pass voltage Vpass2 instead of the first verify pass voltage Vpass1 is applied to the tenth word line WL10, the range of decrease in the channel current of strings in which memory cells coupled to the eleventh word line WL11 are memory cells in the intermediate state IM is relatively wide. That is, when the verify pass voltage to be applied to the tenth word line WL10 is decreased, the verify operation on memory cells adjacent to memory cells in the intermediate state IM has the same effect as that when the verify operation is performed using decreased verify voltages Vvf1' to Vvf7'. Consequently, when the verify pass voltage to be applied to the tenth word line WL10 is decreased, the threshold voltage distribution of memory cells adjacent to the memory cells in the intermediate state IM forms the erase state E and decreased first to seventh program states P1''' to P7'''.

Therefore, by the subsequent fine program operation on the memory cells coupled to the eleventh word line WL11, the difference attributable to disturb of the memory cells coupled to the tenth word line WL10 may be cancelled. As a result, in an embodiment, deterioration of the threshold voltage distribution of memory cells coupled to the tenth word line WL10 may be minimized.

Figure 10A:
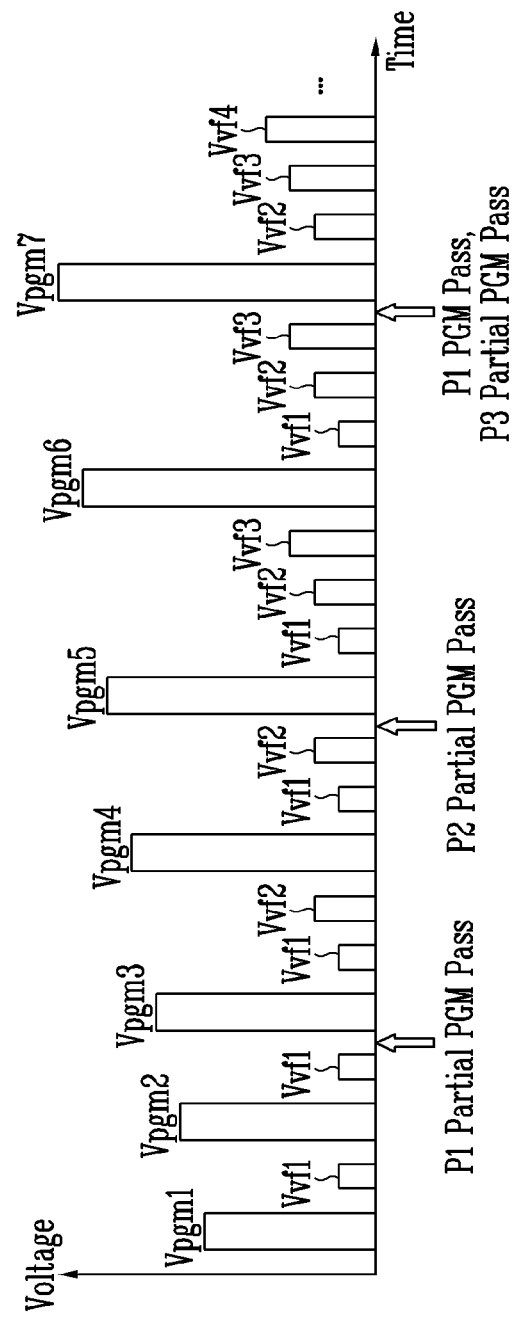
FIGS. 10A and 10B are diagrams illustrating problems in a method of operating a memory device according to an embodiment of the present disclosure.
Figure 10B:
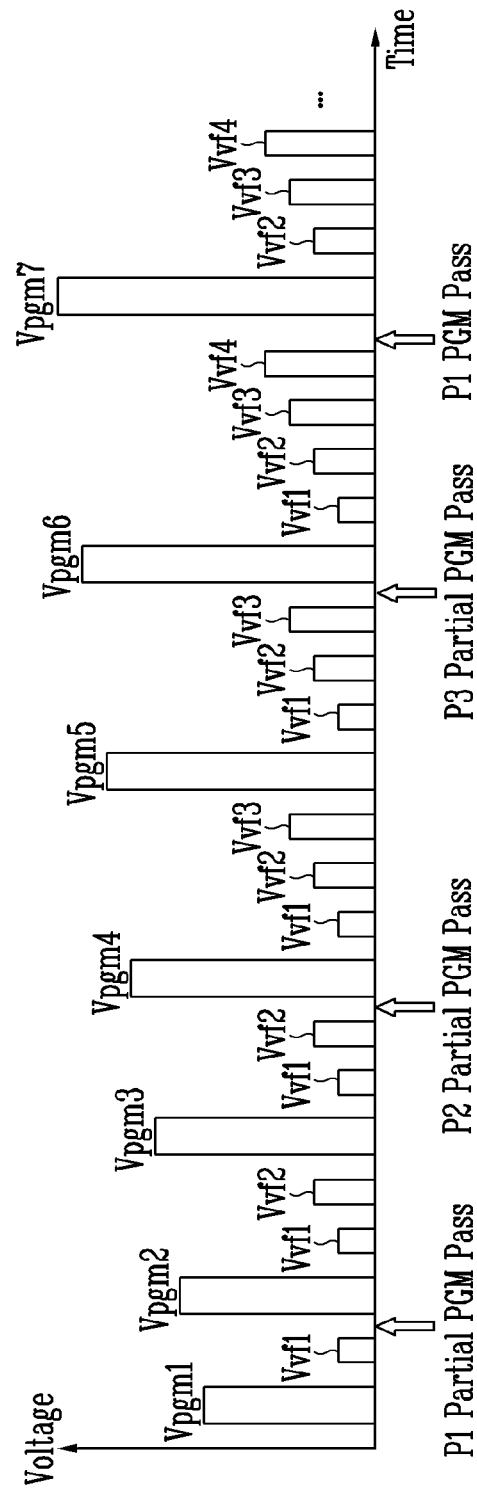

FIGS. 10A and 10B are diagrams illustrating problems in a method of operating a memory device according to an embodiment of the present disclosure.

In detail, a program operation performed in the case where embodiments described above with reference to FIGS. 6 to 9C are not applied, that is, where a first verify pass voltage is also applied to the eleventh word line WL11, as in the case of other unselected word lines, is illustrated in FIG. 10A. Meanwhile, a program operation performed in the case where embodiments described above with reference to FIGS. 6 to 9C are applied, that is, where a second verify pass voltage having a decreased level is also applied to the eleventh word line WL11 is illustrated in FIG. 10B.

Referring to FIG. 10A, a program operation for forming the erase state E and the first to seventh program states P1 to P7 illustrated in FIG. 2 may include a plurality of program loops. At a program pulse apply step in a first program loop, a first program voltage Vpgm1 may be applied to a selected word line. Further, at a verify step in the first program loop, a first verify voltage Vvf1 may be applied to the selected word line. Here, the second to seventh verify voltages Vvf2 to Vvf7 might not be used at the verify step in the first program loop. The reason for this is that, in the initial stage of the program operation, memory cells having threshold voltages higher than the second to seventh verify voltages Vvf2 to Vvf7 might not be present. In the first program loop, the verify operation may be performed using only the first verify voltage Vvf1.

Thereafter, at a program pulse apply step in a second program loop, a second program voltage Vpgm2 may be applied to the selected word line, and at a verify step, the first verify voltage Vvf1 may be applied to the selected word line.

Meanwhile, as a result of performing the verify operation using the first verify voltage Vvf1 in the second program loop, it may be determined that the first program state P1 is partially program-passed. In the present specification, a representation indicating that the first program state P1 is "partially program-passed" may mean that the number of memory cells having threshold voltages higher than the first verify voltage, among the memory cells to be programmed to the first program state P1, is greater than a preset first value. The word "preset" as used herein with respect to a parameter, such as a preset first value, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

In accordance with an embodiment of the present disclosure, the verify operation for the second program state P2 might not be performed in an initial program loop. Meanwhile, when it is determined that the first program state P1 is partially program-passed, a verify operation for the second program state P2 may start. Accordingly, as illustrated in FIG. 10A, a verify operation using first and second verify voltages Vvf1 and Vvf2 may be performed in a third program loop.

Similarly, a verify operation for the third program state P3 might not be performed in the initial program loop. Meanwhile, when it is determined that the second program state P2 is partially program-passed, the verify operation for the third program state P3 may start. Accordingly, as illustrated in FIG. 10A, as a result of performing the verify operation using the second verify voltage Vvf2 in a fourth program loop, it may be determined that the second program state P2 is partially program-passed. Therefore, in a fifth program loop, a verify operation using the first and second verify voltages Vvf1 and Vvf2 may be performed.

Referring back to FIG. 10A, as a result of performing a verify operation using the first verify voltage Vvf1 in a sixth program loop, it may be determined that the first program state P1 is program-passed. In an embodiment of the present specification, a representation indicating that the first program state P1 is "program-passed" may mean that all of threshold voltages of memory cells to be programmed to the first program state P1 are higher than the first verify voltage. In an embodiment, a representation indicating that the first program state P1 is "program-passed" may mean that the number of memory cells having threshold voltages higher than the first verify voltage, among the memory cells to be programmed to the first program state P1, is greater than a preset second value. Here, the second value, which is a basis for determining whether a program pass has occurred, may be greater than the first value, which is a basis for determining whether a partial program pass has occurred.

Because it is determined that the first program state P1 is program-passed in the sixth program loop, a verify operation using the first verify voltage Vvf1 might not be performed in a seventh program loop.

Meanwhile, as a result of performing a verify operation using a third verify voltage Vvf3 in the sixth program loop, it may be determined that the third program state P3 is partially program-passed. Therefore, a verify operation using a fourth verify voltage Vvf4 may be additionally performed in a seventh program loop.

In the same manner as that illustrated in FIG. 10A, performance of an unnecessary verify operation in each program loop may be skipped, and thus, in an embodiment, the total program speed may be improved.

Meanwhile, referring to FIG. 10B, a program operation performed in the case where a second verify pass voltage having a decreased level is applied to an eleventh word line WL11 is illustrated. As described above, in the case where the second verify pass voltage having a decreased level is applied to the eleventh word line WL11 at the verify step in the fine program operation on memory cells coupled to the tenth word line WL10, the same effect as that when the verify voltage is decreased for some memory cells may be obtained. This means that it may be determined that the number of memory cells having threshold voltages higher than the first verify voltage Vvf1 is greater than the actual number of memory cells.

Therefore, compared to the configuration illustrated in FIG. 10A, FIG. 10B shows that a time point at which the first program state P1 is determined to be partially program-passed may be further advanced. According to the embodiment illustrated in FIG. 10A, at the time of completion of the second program loop, the first program state P1 is determined to be partially program-passed, but, according to the embodiment illustrated in FIG. 10B, at the time of completion of the first program loop, the first program state P1 is determined to be partially program-passed.

Therefore, the verify operation using the second verify voltage Vvf2 starts at the second program loop rather than at the third program loop. This results in an increase in the total number of verify operations for the second program state P2 using the second verify voltage Vvf2. Because the number of verify operations for a specific program state, for example, the second program state P2, is increased, the total program time is lengthened. This is the cause of deteriorating the program speed of the memory device.

In accordance with an embodiment of the present disclosure, in a plurality of program loops included in the fine program operation on the first memory cells, a time point at which a verify pass voltage having a decreased level is applied to the second word line is delayed to a time point after the first memory cells in the first program state P1, among the first memory cells, have been partially verify-passed. Accordingly, the number of verify operations unnecessarily performed for the second program state P2 may be reduced. As a result, in an embodiment, the program speed of the memory device may be improved. Hereinafter, a description will be made with reference to FIGS. 11 and 12.

FIG. 11 is a flowchart illustrating an embodiment of step S150 of FIG. 6.

Referring to FIG. 11, step S150 of FIG. 6 may include checking the progress of programming of memory cells to be programmed to a first program state P1 at step S210, determining whether the first program state P1 is partially program-passed or program-passed at step S230, applying a first verify pass voltage to unselected word lines except a second word line in response to determination that the first program state P1 is partially program-passed or program-passed (in the case of Yes at S230) at step S250, applying a second verify pass voltage, lower than the first verify pass voltage, to the second word line at step S270, and applying a verify voltage to a first word line at step S290. Meanwhile, step S150 of FIG. 6 may further include applying the first verify pass voltage to unselected word lines including the second word line in response to determination that the first program state P1 is neither partially program-passed nor program-passed (in the case of No at S230) at step S240, and applying the verify voltage to the first word line at step S290.

At step S210, the progress of programming for the first program state P1 may be checked based on the number of memory cells having threshold voltages higher than the first verify voltage Vvf1, among the memory cells to be programmed to the first program state P1. A detailed embodiment of step S210 will be described below with reference to FIG. 12.

As a result of the determination at step S230, when the first program state P1 is partially program-passed or program-passed (in the case of Yes at step S230), the first verify pass voltage Vpass1 may be applied to the remaining unselected word lines other than the second word line, among the unselected word lines, at step S250, and the second verify pass voltage Vpass2 lower than the first verify pass voltage may be applied to the second word line at step S270. Thereafter, a verify operation on memory cells coupled to the first word line may be performed by applying at least one verify voltage to the first word line. As described above with reference to FIGS. 6 to 9C, the verify pass voltage to be applied to the second word line may be decreased, and deterioration of the threshold voltage distributions of memory cells coupled to the first word line may be minimized by a subsequent fine program operation on the memory cells coupled to the second word line.

As a result of the determination at step S230, when the first program state P1 is neither partially program-passed nor program-passed (in the case of No at step S230), the verify pass voltage to be applied to the second word line is not decreased. That is, when the first program state P1 is neither partially program-passed nor program-passed (in the case of No at step S230), the first verify pass voltage may be equally applied to unselected word lines including the second word line at step S240, and thereafter a verify operation may be performed on memory cells coupled to the first word line by applying the at least one verify voltage to the first word line. In this case, an unnecessary increase in the number of verify operations for the second program state P2 may be minimized.

In accordance with an embodiment illustrated in FIG. 11, before the first program state P1 is partially program-passed (in the case of No at step S230), the verify pass voltage to be applied to be the second word line might not be decreased, and the first verify pass voltage may be applied to unselected word lines at step S240. Further, after the first program state P1 is partially program-passed (in case of Yes at step S230), the second verify pass voltage having a decreased level may be applied to the second word line, among unselected word lines, at step S270. That is, in accordance with an embodiment of the present disclosure, in a plurality of program loops included in the fine program operation on the first memory cells, a time point at which a verify pass voltage having a decreased level is applied to the second word line is delayed to a time point after the first memory cells in the first program state P1, among the first memory cells, have been partially verify-passed. Accordingly, in an embodiment, the number of verify operations unnecessarily performed for the second program state P2 may be reduced.

Figure 12:
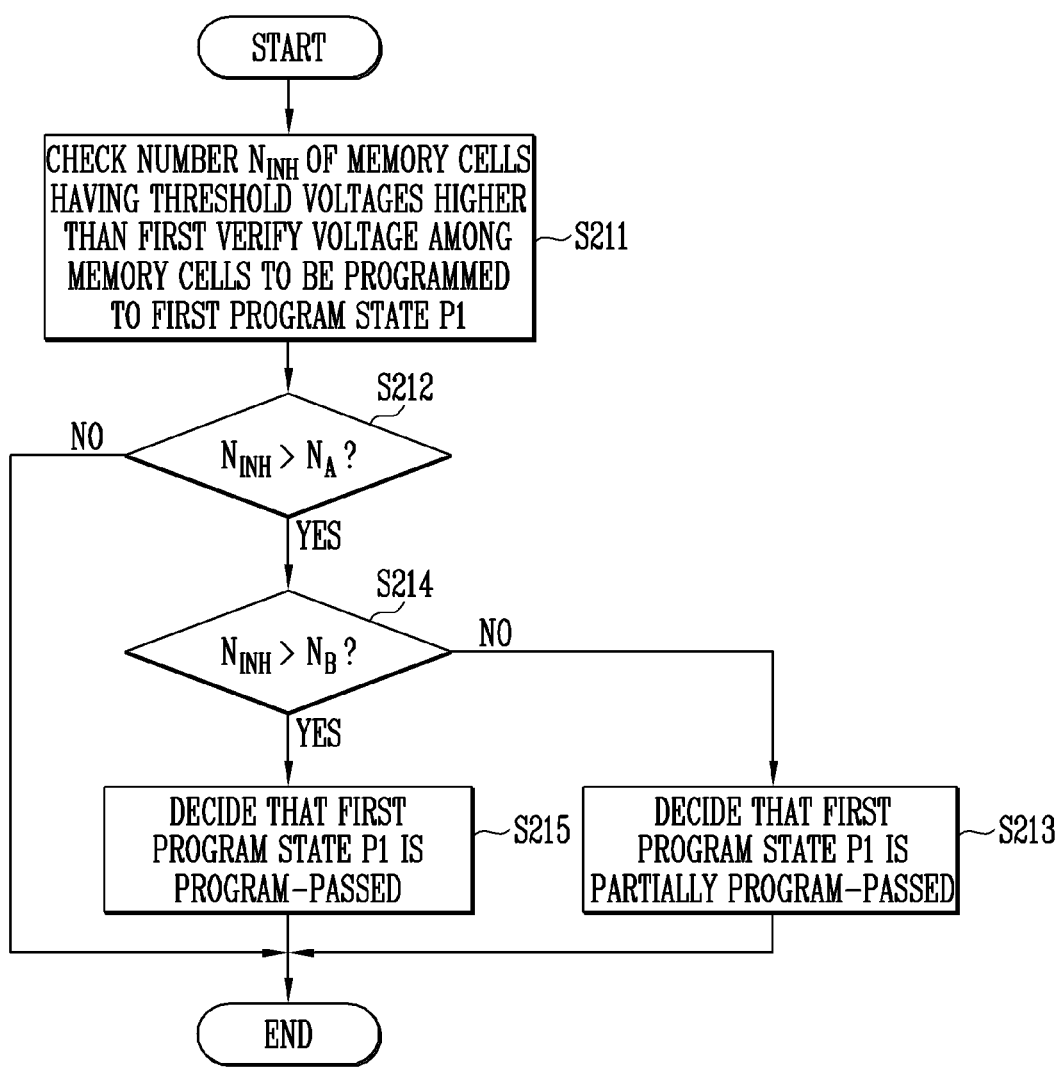
FIG. 12 is a flowchart illustrating an embodiment of step S210 of FIG. 11.

FIG. 12 is a flowchart illustrating an embodiment of step S210 of FIG. 11.

Referring to FIG. 12, step S210 of FIG. 11 may include checking the number $N_{INH}$ of memory cells having threshold voltages higher than a first verify voltage Vvf1, among memory cells to be programmed to the first program state P1 at step S211, determining whether the number $N_{INH}$ of memory cells having threshold voltages higher than the first verify voltage Vvf1, among the memory cells to be programmed to the first program state P1, is greater than a preset first value $N_A$ at step S212, and determining whether the number $N_{INH}$ of memory cells having threshold voltages higher than the first verify voltage Vvf1, among memory cells to be programmed to the first program state P1, is greater than a preset second value $N_B$ at step S214. Meanwhile, step S210 of FIG. 11 may further include deciding that the first program state P1 is partially program-passed in response to determination that the number $N_{INH}$ of memory cells having threshold voltages higher than the first verify voltage Vvf1, among the memory cells to be programmed to the first program state P1, is greater than the first value $N_A$ (in the case of Yes at step S212) and is not greater than the second value $N_B$ (in the case of No at step S214) at step S213. Meanwhile, step S210 of FIG. 11 may further include deciding that the first program state P1 is program-passed in response to determination that the number $N_{INH}$ of memory cells having threshold voltages higher than the first verify voltage Vvf1, among the memory cells to be programmed to the first program state P1, is greater than the first value $N_A$ (in the case of Yes at step S212) and is greater than the second value $N_B$ (in the case of Yes at step S214) at step S215.

At step S211, the number of memory cells having threshold voltages higher than the first verify voltage, that is, the number $N_{INH}$ of program-inhibited cells, among the memory cells to be programmed to the first program state P1, is checked. Thereafter, at step S212, whether the number $N_{INH}$ of memory cells having threshold voltages higher than the first verify voltage is greater than the preset first value $N_A$ is determined. The first value $N_A$ may be a reference value for determining whether the first program state P1 is partially program-passed. When the number $N_{INH}$ of memory cells having threshold voltages higher than the first verify voltage is not greater than the preset first value $N_A$ (in the case of No at step S212), the first program state is neither partially program-passed nor program-passed. Therefore, step S210 may be terminated without step S213 or S215 being performed.

When the number $N_{INH}$ of memory cells having threshold voltages higher than the first verify voltage is greater than the preset first value $N_A$ (in the case of Yes at step S212), whether the number $N_{INH}$ is greater than the preset second value $N_B$ is determined at step S214. The second value $N_B$ may be a reference value for determining whether the first program state P1 is program-passed. Therefore, the second value $N_B$ may be greater than the first value $N_A$. When the number $N_{INH}$ of memory cells having threshold voltages higher than the first verify voltage is not greater than the second value $N_B$, it may be decided that the first program state P1 is not program-passed, but is partially program-passed at step S213. On the other hand, when the number $N_{INH}$ of memory cells having threshold voltages higher than the first verify voltage is greater than the second value $N_B$, it may be decided that the first program state P1 is program-passed at step S215.

In FIGS. 11 and 12, an embodiment in which the number of verify operations unnecessarily performed for the second program state P2 is reduced has been described. Below, with reference to FIGS. 13 and 14, an additional embodiment in which the number of verify operations unnecessarily performed for the second program state P2 is reduced will be described.

Figure 13:
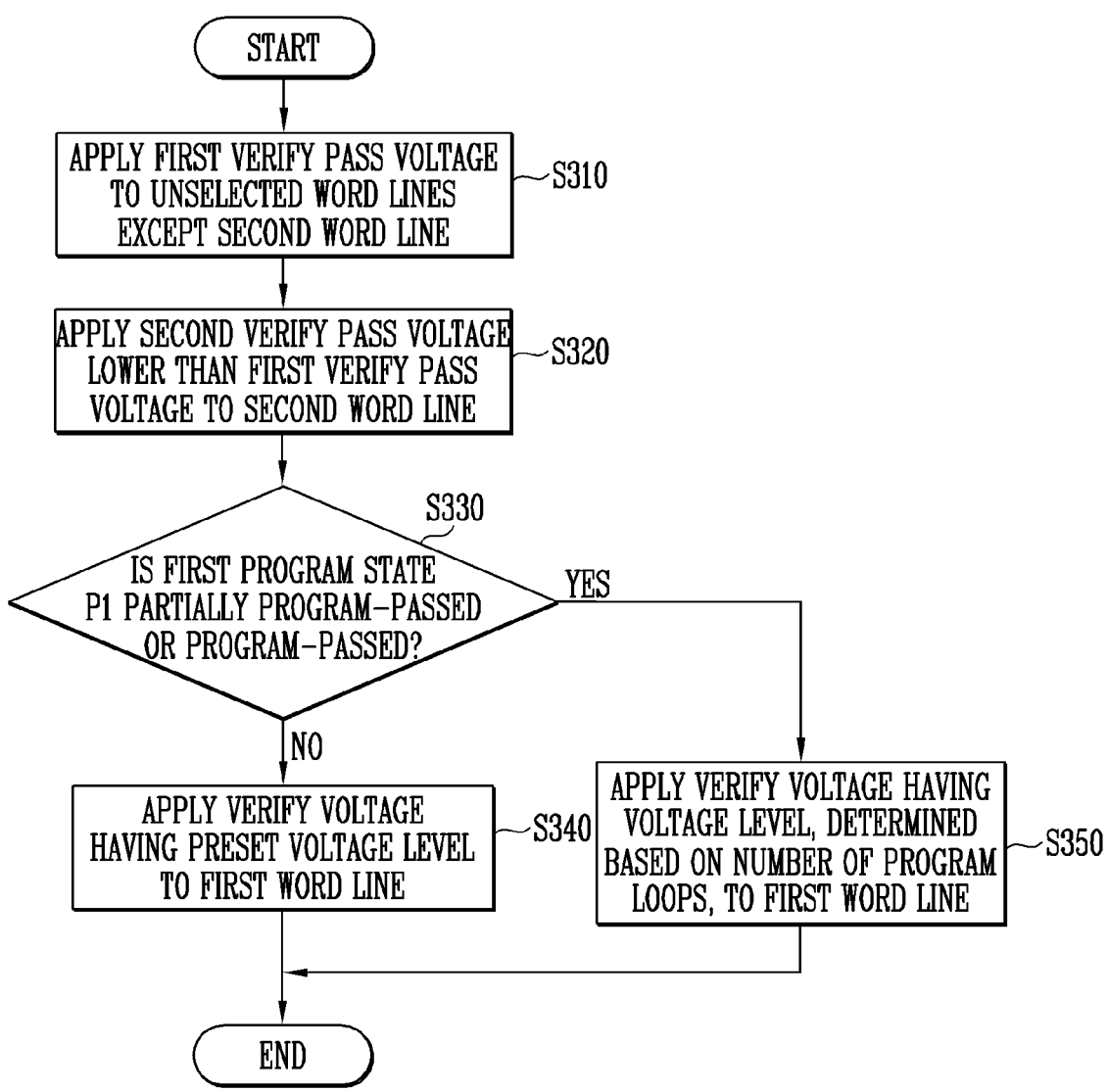
FIG. 13 is a flowchart illustrating an embodiment of step S150 of FIG. 6.

FIG. 13 is a flowchart illustrating an embodiment of step S150 of FIG. 6.

Referring to FIG. 13, step S150 of FIG. 6 may include applying a first verify pass voltage Vpass1 to unselected word lines except a second word line at step S310, applying a second verify pass voltage Vpass2, lower than the first verify pass voltage, to the second word line at step S320, determining whether a first program state P1 is partially program-passed or program-passed at step S330, when the first program state P1 is neither partially program-passed nor program-passed (in the case of No at step S330), applying a verify voltage having a preset voltage level to a first word line at step S340, and when the first program state P1 is partially program-passed or program-passed (in the case of Yes at step S330), applying a verify voltage having a voltage level determined based on the number of program loops to the first word line at step S350.

Steps S310 and S320 of FIG. 13 are substantially the same as steps S151 and S153 of FIG. 7. Therefore, repeated descriptions of steps S310 and S320 will be omitted.

At step S330, whether the first program state P1 is partially program-passed or program-passed is determined. Here, in the same manner as that described above with reference to FIG. 12, whether the first program state P1 is partially program-passed or program-passed may be determined.

When the first program state P1 is neither partially program-passed nor program-passed (in the case of No at step S330), a verify voltage having a preset fixed voltage level is applied to the first word line at step S340. The voltage level of the verify voltage applied to the selected first word line at step S340 may be a relatively large value.

When the first program state P1 is partially program-passed or program-passed (in the case of Yes at step S330), the verify voltage having the voltage level determined based on the number of program loops is applied to the first word line at step S350. The voltage level of the verify voltage applied to the selected first word line at step S350 may be a relatively small value. In particular, the voltage level of the verify voltage applied to the selected first word line at step S350 may be lower than that of the verify voltage applied to the first word line at step S340.

In accordance with an embodiment illustrated in FIG. 13, before the first program state P1 is partially program-passed, a verify voltage having a relatively high voltage level may be applied to the first word line, which is the selected word line. After the first program state P1 is partially program-passed, a verify voltage having a relatively low voltage level may be applied to the first word line. Below, a description will be made in detail with reference to FIG. 14.

Figure 14:
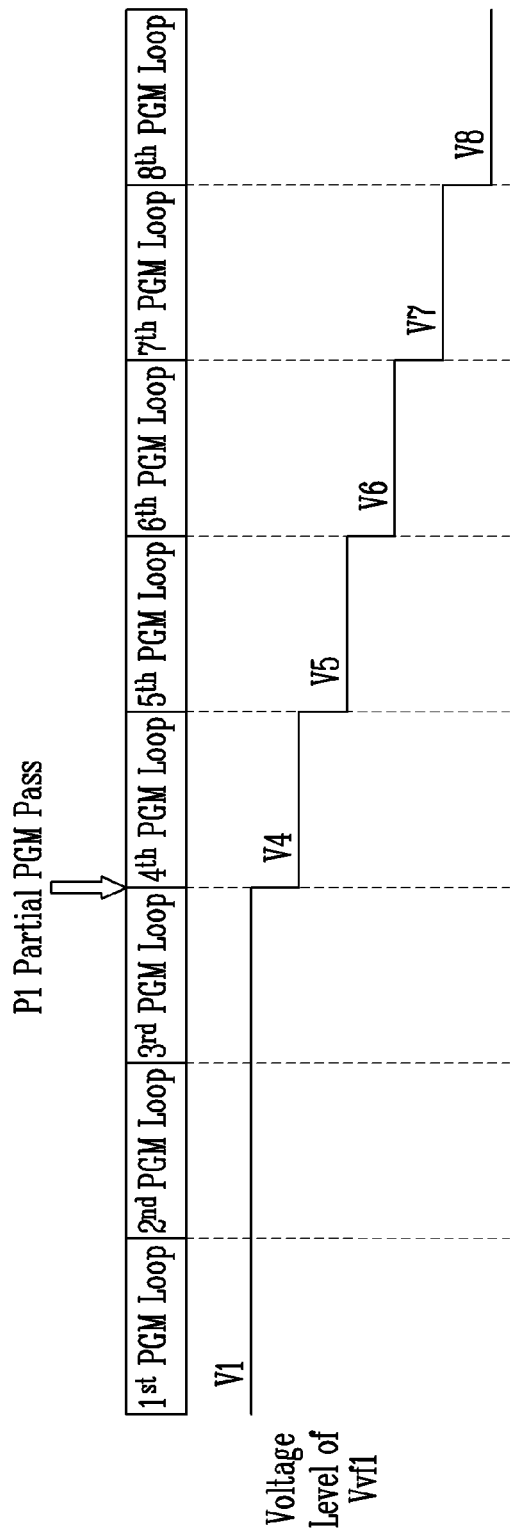
FIG. 14 is a diagram illustrating the embodiment of FIG. 13.

FIG. 14 is a diagram illustrating the embodiment of FIG. 13.

Referring to FIG. 14, a plurality of program loops required to perform a fine program operation on memory cells coupled to a first word line, and the voltage levels of a verify voltage applied to a first word line, that is, a first verify voltage Vvf1, in verify operations of respective program loops, are illustrated. In FIG. 14, first to eighth program loops are illustrated by way of example. Meanwhile, in FIG. 14, the case where a first program state P1 is partially program-passed by performing a third program loop is illustrated by way of example.

In the first program loop, the first verify voltage Vvf1 applied to the first word line has a first voltage level V1. The first voltage level V1 may be the voltage level of the first verify voltage Vvf1 applied to the first word line before the first program state P1 is partially program-passed, and may be a preset value. Therefore, in the first to third program loops, the voltage level of the first verify voltage Vvf1 applied to the first word line may be fixed at the first voltage level V1.

Meanwhile, in the fourth program loop, the first verify voltage Vvf1 applied to the first word line has a fourth voltage level V4. The fourth voltage level V4 may be lower than the first voltage level V1. Further, in the fifth program loop, the first verify voltage Vvf1 applied to the first word line has a fifth voltage level V5. The fifth voltage level V5 may be lower than the first voltage level V1. In an embodiment, the fifth voltage level V5 may be lower the fourth voltage level V4.

In this way, after the first program state P1 is partially program-passed, the first verify voltage Vvf1 having voltage levels V4 to V8 determined based on the number of program loops may be applied to the first word line.

Referring to FIG. 14, before the first program state P1 is partially program-passed, the first verify voltage Vvf1 having the first voltage level V1 which is relatively high may be applied to the first word line. Therefore, a time point at which the first program state P1 is partially program-passed may be delayed. Accordingly, the number of verify operations unnecessarily performed for the second program state P2 may be reduced.

In FIGS. 13 and 14, the additional embodiment in which the number of verify operations unnecessarily performed for the second program state P2 is reduced has been described. Below, with reference to FIGS. 15, 16A, and 16B, an additional embodiment in which the number of verify operations unnecessarily performed for the second program state P2 is reduced will be described.

Figure 15:
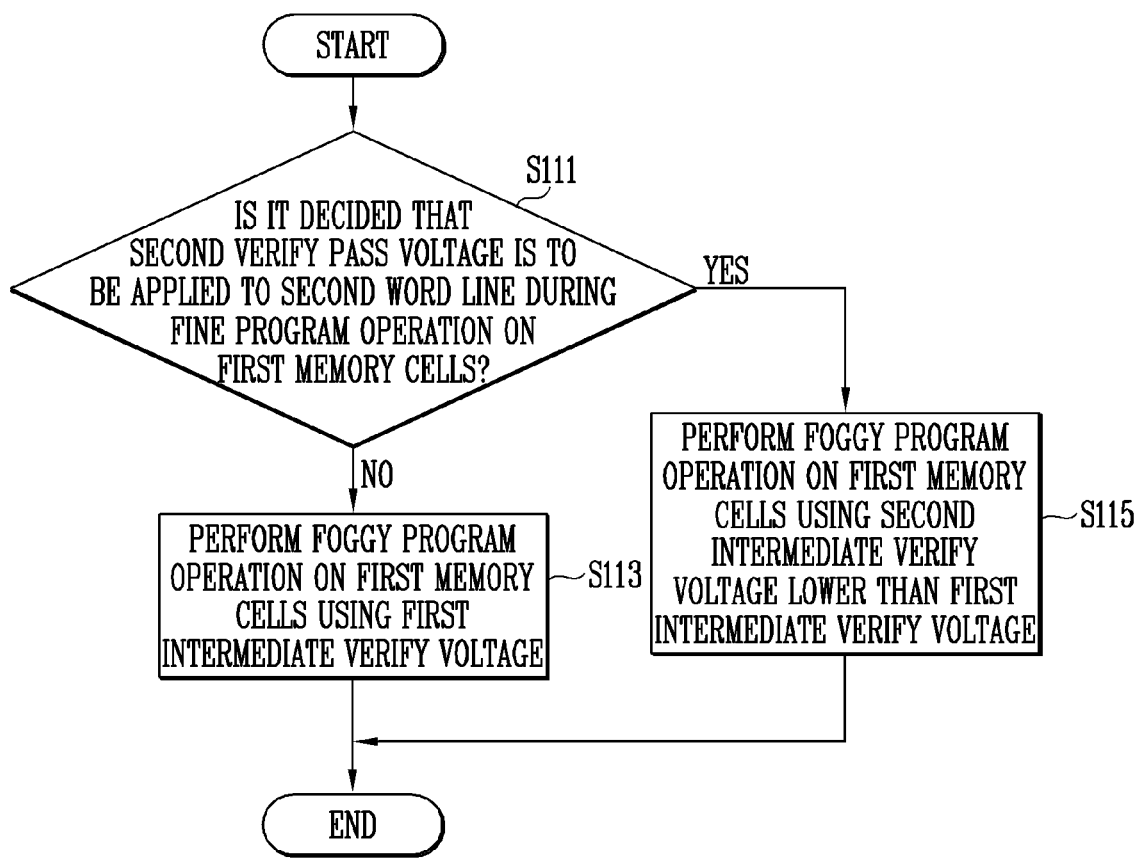
FIG. 15 is a flowchart illustrating an embodiment of step S110 of FIG. 6.
Figure 16A:
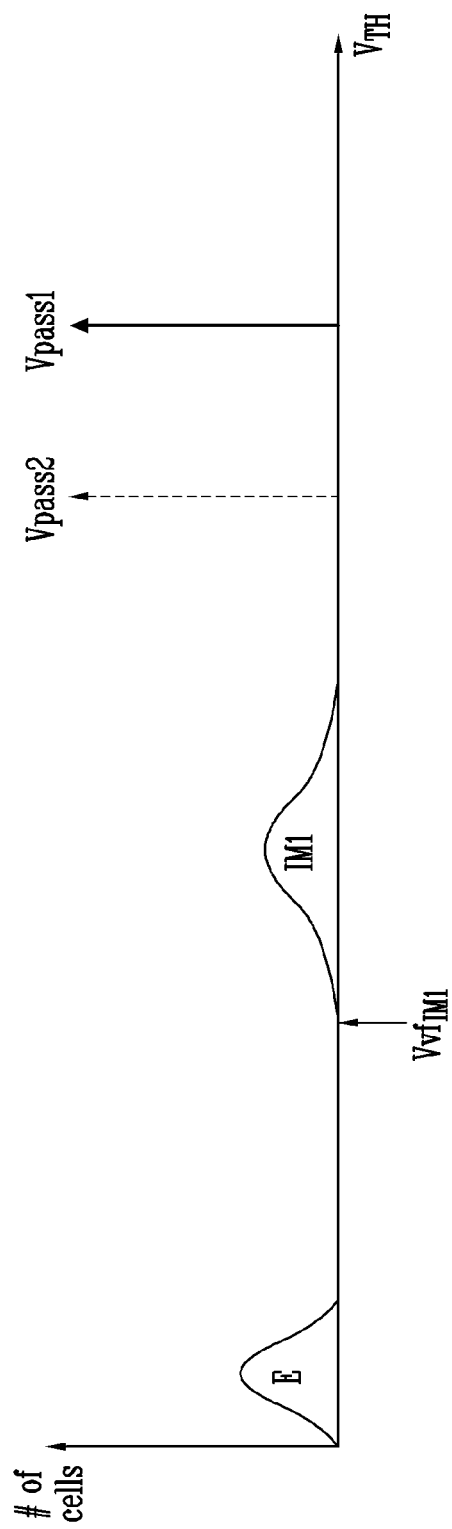
FIGS. 16A and 16B are diagrams illustrating the embodiment of FIG. 15.
Figure 16B:
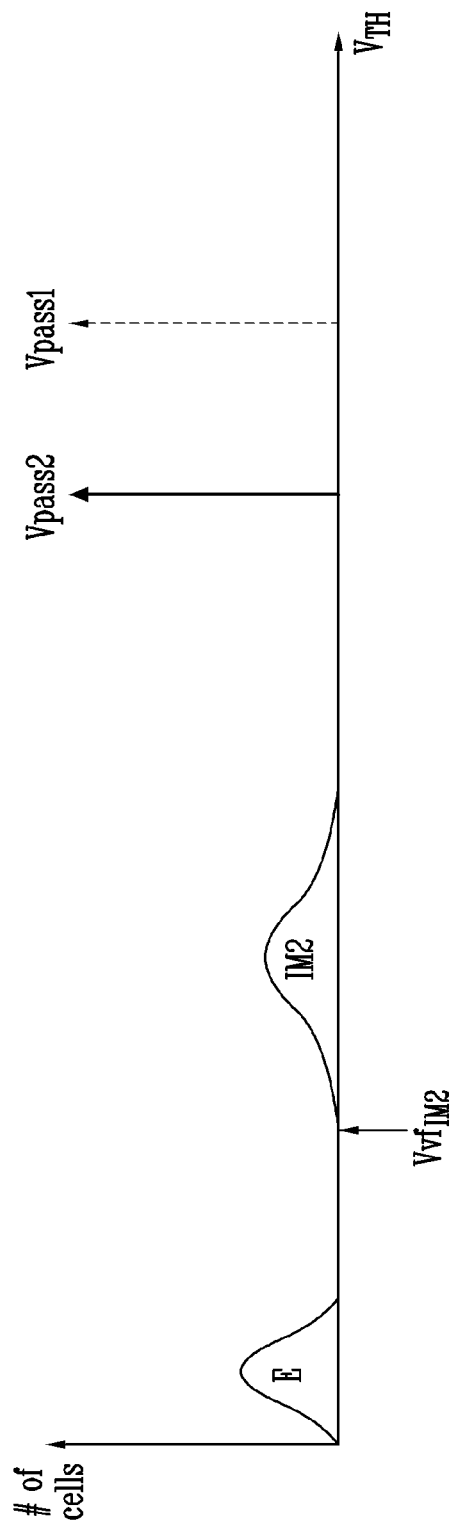

FIG. 15 is a flowchart illustrating an embodiment of step S110 of FIG. 6. FIGS. 16A and 16B are diagrams illustrating the embodiment of FIG. 15. Hereinafter, an embodiment of step S110 of FIG. 6 will be described with reference to FIGS. 15, 16A, and 16B together.

Referring to FIG. 15, step S110 of FIG. 6 may include determining whether a second verify pass voltage has been decided to be applied to a second word line during a fine program operation on first memory cells at step S111, performing a foggy program operation on the first memory cells using a first intermediate verify voltage in response to determination that a first verify pass voltage other than the second verify pass voltage has been decided to be applied to the second word line during the fine program operation on the first memory cells (in the case of No at step S111) at step S113, and performing a foggy program operation on the first memory cells using a second intermediate verify voltage lower than the first intermediate verify voltage in response to determination that the second verify pass voltage has been decided to be applied to the second word line during the fine program operation on the first memory cells at step S115.

In order to perform the embodiment illustrated in FIG. 15, whether the first verify pass voltage applied to other unselected word lines is to be equally applied to the second word line or whether a second verify pass voltage having a decreased level is to be applied to the second word line in the fine program operation on the first memory cells needs to be decided in advance.

When it is decided that the first verify pass voltage that is typically used, other than the second verify pass voltage, is to be applied to the second word line in the fine program operation on the first memory cells (in the case of No at step S111), a foggy program operation is performed on the first memory cells using the first intermediate verify voltage $Vvf_{IM1}$ which has a relatively high level.

Referring to FIG. 16A, illustrated is a threshold voltage distribution corresponding to the foggy program operation performed on the first memory cells when it is decided that the first verify pass voltage that is typically used, other than the second verify pass voltage, is to be applied to the second word line in the fine program operation on the first memory cells (in the case of No at step S111). As illustrated in FIG. 16A, when it is decided that the first verify pass voltage Vpass1 is to be applied to the second word line in the fine program operation on the first memory cells (in the case of No at step S111), the foggy program operation is performed on the first memory cells using the relatively high first intermediate verify voltage $Vvf_{IM1}$, and thus a first intermediate state IM1 having relatively high threshold voltages is formed.

When it is decided that the second verify pass voltage having a decreased level is to be applied to the second word line in the fine program operation on the first memory cells (in the case of Yes at step S111), the foggy program operation is performed on the first memory cells using a second intermediate verify voltage $Vvf_{IM2}$ having a relatively low level.

Referring to FIG. 16B, illustrated is a threshold voltage distribution corresponding to the foggy program operation performed on the first memory cells when it is decided that the second verify pass voltage is to be applied to the second word line in the fine program operation on the first memory cells (in the case of Yes at step S111). As illustrated in FIG. 16B, when it is decided that the second verify pass voltage Vpass2 is to be applied to the second word line in the fine program operation on the first memory cells (in the case of Yes at step S111), the foggy program operation is performed on the first memory cells using the second intermediate verify voltage $Vvf_{IM2}$ which is relatively low, and thus a second intermediate state IM2 having relatively low threshold voltages is formed.

That is, when it is decided that the second verify pass voltage Vpass2 is to be applied to the second word line in a verify operation included in step S150 of FIG. 6 where the subsequent second fine program operation is performed (in the case of Yes at step S111), the second intermediate state IM2 having relatively low threshold voltages is formed using a second intermediate verify voltage $Vvf_{IM2}$ which is relatively low in the foggy program operation at step S110. Accordingly, during the fine program operation on memory cells coupled to the first word line at step S150 of FIG. 6, a time point at which the first program state P1 is partially program-passed may be delayed. Accordingly, in an embodiment, the number of verify operations unnecessarily performed for the second program state P2 may be reduced.

An embodiment of the present disclosure may provide a memory device that is capable of reducing the time required for programming while decreasing program disturb.

What is claimed is:

1. A memory device comprising:
a memory block including a plurality of memory cells;
a peripheral circuit configured to perform a program operation on selected memory cells among the plurality of memory cells; and
control logic configured to control the program operation performed by the peripheral circuit;
wherein the control logic is configured to control the peripheral circuit to:
perform a foggy program operation on first memory cells coupled to a first word line, among the plurality of memory cells;
perform a foggy program operation on second memory cells coupled to a second word line adjacent to the first word line, among the plurality of memory cells; and
perform a fine program operation on the first memory cells by decreasing a verify pass voltage applied to the second word line.

2. The memory device according to claim 1, wherein:
the foggy program operation on the first and second memory cells is an operation of programming the first and second memory cells such that a threshold voltage of each of the first and second memory cells belongs to any one of an erase state and an intermediate state, and the fine program operation on the first memory cells is an operation of programming the first memory cells such that a threshold voltage of each of the first memory cells belongs to any one of the erase state and first to $(2^N-1)$-th program states, where N is a natural number equal to or greater than 2.

3. The memory device according to claim 1, wherein, during the fine program operation on the first memory cells, the control logic is configured to control the peripheral circuit to apply a first verify pass voltage to unselected word lines except the second word line, apply a second verify pass voltage, lower than the first verify pass voltage, to the second word line, and apply a verify voltage to the first word line.

4. The memory device according to claim 2, wherein, during the fine program operation on the first memory cells, the control logic is configured to control the peripheral circuit to check a progress of programming of memory cells to be programmed to a first program state, among the first memory cells.

5. The memory device according to claim 4, wherein, when the first program state is partially program-passed, the control logic is configured to control the peripheral circuit to apply a first verify pass voltage to unselected word lines except the second word line, apply a second verify pass voltage, lower than the first verify pass voltage, to the second word line, and apply a verify voltage to the first word line.

6. The memory device according to claim 4, wherein, when the first program state is not partially program-passed, the control logic is configured to control the peripheral circuit to apply a first verify pass voltage to unselected word lines including the second word line and apply a verify voltage to the first word line.

7. The memory device according to claim 4, wherein the control logic is configured to, when a number of memory cells having threshold voltages higher than a first verify voltage, among memory cells to be programmed to the first program state, is greater than a preset first value, determine that the first program state is partially program-passed.

8. The memory device according to claim 4, wherein, during the fine program operation on the first memory cells, the control logic is configured to:
control the peripheral circuit to apply a first verify pass voltage to unselected word lines except the second word line and apply a second verify pass voltage, lower than the first verify pass voltage, to the second word line, and
control the peripheral circuit to, when the first program state is not partially program-passed, apply a verify voltage having a preset first voltage level to the first word line.

9. The memory device according to claim 4, wherein, during the fine program operation on the first memory cells, the control logic is configured to:
control the peripheral circuit to apply a first verify pass voltage to unselected word lines except the second word line and apply a second verify pass voltage, lower than the first verify pass voltage, to the second word line, and
control the peripheral circuit to, when the first program state is partially program-passed, apply a verify voltage having a voltage level, determined based on a number of program loops, to the first word line.

10. The memory device according to claim 2, wherein, during the foggy program operation on the first memory cells, the control logic is configured to control the peripheral circuit to, when it is decided to perform the fine program operation on the first memory cells without decreasing a verify pass voltage to be applied to the second word line in the fine program operation on the first memory cells, perform the foggy program operation on the first memory cells using a first intermediate verify voltage.

11. The memory device according to claim 10, wherein, during the foggy program operation on the first memory cells, the control logic is configured to control the peripheral circuit to, when it is decided to perform the fine program operation on the first memory cells by decreasing a verify pass voltage to be applied to the second word line in the fine program operation on the first memory cells, perform the foggy program operation on the first memory cells using a second intermediate verify voltage lower than the first intermediate verify voltage.

12. A method of operating a memory device, the method comprising:
performing a foggy program operation using a first verify pass voltage on first memory cells coupled to a first word line;
performing a foggy program operation using the first verify pass voltage on second memory cells coupled to a second word line adjacent to the first word line; and
performing a fine program operation on the first memory cells using the first verify pass voltage and a second verify pass voltage lower than the first verify pass voltage.

13. The method according to claim 12, wherein performing the fine program operation on the first memory cells comprises:
applying the first verify pass voltage to unselected word lines except the second word line;
applying the second verify pass voltage to the second word line; and
applying a verify voltage to the first word line.

14. The method according to claim 12, wherein performing the fine program operation on the first memory cells comprises:
checking threshold voltages of memory cells to be programmed to a first program state among first to $(2^N-1)$-th program states, where N is a natural number equal to or greater than 2;
applying the first verify pass voltage to unselected word lines except the second word line in response to a determination that the first program state is partially program-passed;
applying the second verify pass voltage, lower than the first verify pass voltage, to the second word line; and
applying a verify voltage to the first word line.

15. The method according to claim 12, wherein performing the fine program operation on the first memory cells comprises:
checking threshold voltages of memory cells to be programmed to a first program state among first to $(2^N-1)$-th program states;
applying the first verify pass voltage to unselected word lines including the second word line in response to a determination that the first program state is not partially program-passed; and
applying a verify voltage to the first word line.

16. The method according to claim 14, wherein checking the threshold voltages of memory cells to be programmed to the first program state among first to $(2^N-1)$-th program states comprises:

checking a number of memory cells having threshold voltages higher than a first verify voltage among memory cells to be programmed to the first program state; and determining that the first program state is partially program-passed in response to a determination that the checked number of memory cells is greater than a preset first value.

17. The method according to claim 12, wherein performing the fine program operation on the first memory cells comprises:

applying the first verify pass voltage to unselected word lines except the second word line;

applying the second verify pass voltage, lower than the first verify pass voltage, to the second word line; and applying a verify voltage having a preset voltage level to the first word line in response to a determination that the first program state, among first to $(2^N-1)$-th program states, is not partially program-passed.

18. The method according to claim 13, wherein performing the fine program operation on the first memory cells comprises:

applying the first verify pass voltage to unselected word lines except the second word line;

applying the second verify pass voltage, lower than the first verify pass voltage, to the second word line; and applying a verify voltage having a voltage level, determined based on a number of program loops, to the first word line in response to a determination that the first program state, among first to $(2^N-1)$-th program states, is partially program-passed.

19. The method according to claim 12, wherein performing the foggy program operation using the first verify pass voltage on the first memory cells coupled to the first word line comprises:

deciding whether a verify pass voltage to be applied to the second word line is to be decreased in performing the fine program operation on the first memory cells;

determining an intermediate verify voltage for forming the intermediate state based on a decision of whether the verify pass voltage is to be decreased; and performing a program operation on the first memory cells based on the determined intermediate verify voltage.

20. The method according to claim 19, wherein determining the intermediate verify voltage comprises determining a first voltage that is high to be the intermediate verify voltage in response to a decision that the verify pass voltage is not to be decreased.

21. The method according to claim 19, wherein determining the intermediate verify voltage comprises determining a second voltage that is low to be the intermediate verify voltage in response to a decision that the verify pass voltage is to be decreased.

* * * * *